(12) United States Patent
Angell et al.

(10) Patent No.: US 8,775,238 B2
(45) Date of Patent: Jul. 8, 2014

(54) GENERATING CUSTOMIZED DISINCENTIVE MARKETING CONTENT FOR A CUSTOMER BASED ON CUSTOMER RISK ASSESSMENT

(75) Inventors: Robert Lee Angell, Salt Lake City, UT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 11/862,320

(22) Filed: Sep. 27, 2007

(65) Prior Publication Data

US 2008/0249869 A1    Oct. 9, 2008

Related U.S. Application Data

(63) Continuation-in-part of application No. 11/695,983, filed on Apr. 3, 2007.

(51) Int. Cl.
*G06Q 30/00*    (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| | | |
|---|---|---|
| 4,929,819 A | 5/1990 | Collins, Jr. |
| 5,091,780 A | 2/1992 | Pomerleau |
| 5,231,483 A | 7/1993 | Sieber et al. |
| 5,233,513 A | 8/1993 | Doyle |
| 5,511,006 A * | 4/1996 | Tachibana et al. ............ 702/130 |
| 5,729,697 A | 3/1998 | Schkolnick et al. |
| 5,799,292 A | 8/1998 | Hekmatpour |
| 5,855,008 A | 12/1998 | Goldhaber et al. |
| 5,898,475 A | 4/1999 | Martin |
| 5,918,211 A | 6/1999 | Sloane |
| 5,933,811 A | 8/1999 | Angles et al. |
| 5,956,081 A | 9/1999 | Katz et al. |

(Continued)

FOREIGN PATENT DOCUMENTS

| | | |
|---|---|---|
| GB | 2247592 A | 3/1992 |
| JP | 2003187335 A | 7/2003 |

(Continued)

OTHER PUBLICATIONS

M. D. Kittle, Pilfered Profits; Both retailers and consumers take a hit from shoplifting, Apr. 28, 2002, Telegraph-Herald, Dubuque, Iowa, p. D1.*

(Continued)

*Primary Examiner* — Alvin L Brown
(74) *Attorney, Agent, or Firm* — Yee & Associates, P.C.; John R. Pivnichny

(57) ABSTRACT

A computer implemented method, apparatus, and computer usable program product for managing a level of marketing disincentives directed towards a customer using a risk assessment score. In one embodiment, a risk assessment score for a customer associated with a retail facility is retrieved. The risk assessment score is analyzed to determine whether the customer is a desirable customer or an undesirable customer. In response to the risk assessment score indicating that the customer is an undesirable customer, aggressive marketing disincentives targeted to the undesirable customer are generated. If the risk assessment score indicates the customer is a desirable customer, marketing incentives targeted to the desirable customer are generated.

23 Claims, 13 Drawing Sheets

(56) References Cited

U.S. PATENT DOCUMENTS

| | | |
|---|---|---|
| 6,009,410 A | 12/1999 | LeMole et al. |
| 6,028,626 A | 2/2000 | Aviv |
| 6,032,127 A | 2/2000 | Schkolnick et al. |
| 6,052,676 A | 4/2000 | Hekmatpour |
| 6,055,513 A | 4/2000 | Katz et al. |
| 6,101,486 A | 8/2000 | Roberts et al. |
| 6,115,709 A | 9/2000 | Gilmour et al. |
| 6,118,887 A | 9/2000 | Cosatto et al. |
| 6,128,663 A | 10/2000 | Thomas |
| 6,167,441 A | 12/2000 | Himmel |
| 6,191,692 B1 * | 2/2001 | Stoltz et al. ............... 340/572.9 |
| 6,226,784 B1 | 5/2001 | Holmes et al. |
| 6,249,768 B1 | 6/2001 | Tulskie, Jr. et al. |
| 6,266,649 B1 | 7/2001 | Linden et al. |
| 6,334,109 B1 | 12/2001 | Kanevsky et al. |
| 6,366,298 B1 | 4/2002 | Haitsuka et al. |
| 6,393,163 B1 | 5/2002 | Burt et al. |
| 6,400,276 B1 | 6/2002 | Clark |
| 6,507,366 B1 | 1/2003 | Lee |
| 6,560,639 B1 | 5/2003 | Dan et al. |
| 6,571,216 B1 | 5/2003 | Garg et al. |
| 6,571,279 B1 | 5/2003 | Herz et al. |
| 6,584,445 B2 | 6/2003 | Papageorge |
| 6,593,852 B2 | 7/2003 | Gutta et al. |
| 6,647,257 B2 | 11/2003 | Owensby |
| 6,647,269 B2 | 11/2003 | Hendrey et al. |
| 6,659,344 B2 | 12/2003 | Otto et al. |
| 6,738,532 B1 | 5/2004 | Oldroyd |
| 6,754,389 B1 | 6/2004 | Dimitrova et al. |
| 6,829,475 B1 | 12/2004 | Lee et al. |
| 6,856,249 B2 | 2/2005 | Strubbe et al. |
| 6,879,960 B2 | 4/2005 | Nascenzi et al. |
| 6,976,000 B1 | 12/2005 | Manganaris et al. |
| 7,010,501 B1 | 3/2006 | Roslak et al. |
| 7,028,018 B2 | 4/2006 | Kocher |
| 7,044,369 B2 | 5/2006 | Gantz |
| 7,080,778 B1 | 7/2006 | Kressin et al. |
| 7,092,959 B2 | 8/2006 | Chen et al. |
| 7,118,476 B1 | 10/2006 | White et al. |
| 7,168,618 B2 | 1/2007 | Schwartz |
| 7,195,157 B2 | 3/2007 | Swartz et al. |
| 7,200,266 B2 | 4/2007 | Ozer et al. |
| 7,224,852 B2 | 5/2007 | Lipton et al. |
| 7,310,442 B2 | 12/2007 | Monachino et al. |
| 7,319,379 B1 | 1/2008 | Melvin |
| 7,319,479 B1 | 1/2008 | Crabtree et al. |
| 7,357,316 B2 | 4/2008 | Heckel et al. |
| 7,370,004 B1 | 5/2008 | Patel et al. |
| 7,394,916 B2 | 7/2008 | Brodsky et al. |
| 7,472,080 B2 | 12/2008 | Goel |
| 7,480,395 B2 | 1/2009 | Parunak et al. |
| 7,548,874 B2 | 6/2009 | Kanevsky et al. |
| 7,606,728 B2 | 10/2009 | Sorensen |
| 7,630,986 B1 | 12/2009 | Herz et al. |
| 7,673,797 B2 | 3/2010 | Edwards |
| 7,687,744 B2 | 3/2010 | Walter et al. |
| 7,788,170 B2 | 8/2010 | Lilly et al. |
| 7,801,762 B2 | 9/2010 | Walker et al. |
| 7,813,952 B2 | 10/2010 | Eskandari |
| 7,826,923 B2 | 11/2010 | Walker et al. |
| 7,865,371 B2 | 1/2011 | Shen |
| 7,908,233 B2 | 3/2011 | Angell et al. |
| 7,908,237 B2 | 3/2011 | Angell et al. |
| 7,925,549 B2 | 4/2011 | Looney et al. |
| 7,933,797 B2 | 4/2011 | Sorensen |
| 7,975,917 B2 | 7/2011 | Clark et al. |
| 8,195,499 B2 | 6/2012 | Angell et al. |
| 2002/0107741 A1 | 8/2002 | Stern et al. |
| 2002/0111852 A1 | 8/2002 | Levine |
| 2002/0116265 A1 | 8/2002 | Hernandez |
| 2002/0121547 A1 | 9/2002 | Wieth et al. |
| 2002/0143613 A1 | 10/2002 | Hong et al. |
| 2002/0161651 A1 | 10/2002 | Godsey et al. |
| 2002/0171736 A1 | 11/2002 | Gutta et al. |
| 2002/0178013 A1 * | 11/2002 | Hoffman et al. ................ 705/1 |
| 2003/0088463 A1 | 5/2003 | Kanevsky et al. |
| 2003/0105667 A1 | 6/2003 | Millikan |
| 2003/0107650 A1 | 6/2003 | Colmenarez et al. |
| 2003/0212580 A1 | 11/2003 | Shen |
| 2003/0217024 A1 | 11/2003 | Kocher |
| 2003/0228035 A1 | 12/2003 | Parunak et al. |
| 2003/0231769 A1 | 12/2003 | Bolle et al. |
| 2004/0078236 A1 | 4/2004 | Stoodley et al. |
| 2004/0111454 A1 | 6/2004 | Sorensen |
| 2004/0113933 A1 | 6/2004 | Guler |
| 2004/0120581 A1 | 6/2004 | Ozer et al. |
| 2004/0125125 A1 * | 7/2004 | Levy ............................ 345/716 |
| 2004/0143505 A1 * | 7/2004 | Kovach ......................... 705/23 |
| 2004/0151374 A1 | 8/2004 | Lipton et al. |
| 2004/0156530 A1 | 8/2004 | Brodsky et al. |
| 2004/0225627 A1 | 11/2004 | Botros et al. |
| 2005/0002561 A1 | 1/2005 | Monachino et al. |
| 2005/0012817 A1 | 1/2005 | Hampapur et al. |
| 2005/0185392 A1 | 8/2005 | Walter et al. |
| 2005/0187819 A1 | 8/2005 | Johnson |
| 2006/0007308 A1 | 1/2006 | Ide et al. |
| 2006/0010028 A1 | 1/2006 | Sorensen |
| 2006/0032914 A1 | 2/2006 | Brewster et al. |
| 2006/0032915 A1 | 2/2006 | Schwartz |
| 2006/0074769 A1 | 4/2006 | Looney et al. |
| 2006/0089918 A1 | 4/2006 | Avanzi et al. |
| 2006/0116927 A1 | 6/2006 | Miller, III et al. |
| 2006/0184410 A1 | 8/2006 | Ramamurthy et al. |
| 2006/0190419 A1 * | 8/2006 | Bunn et al. ..................... 706/2 |
| 2006/0200378 A1 | 9/2006 | Sorensen |
| 2006/0218057 A1 | 9/2006 | Fitzpatrick et al. |
| 2006/0219780 A1 | 10/2006 | Swartz et al. |
| 2006/0251541 A1 | 11/2006 | Santandrea |
| 2007/0008408 A1 | 1/2007 | Zehavi |
| 2007/0050828 A1 | 3/2007 | Renzi et al. |
| 2007/0052536 A1 * | 3/2007 | Hawkes et al. ............... 340/540 |
| 2007/0069014 A1 | 3/2007 | Heckel et al. |
| 2007/0078759 A1 * | 4/2007 | Lilly et al. ..................... 705/38 |
| 2007/0100649 A1 | 5/2007 | Walker et al. |
| 2007/0112713 A1 | 5/2007 | Seaman et al. |
| 2007/0118419 A1 | 5/2007 | Maga et al. |
| 2007/0192183 A1 | 8/2007 | Monaco et al. |
| 2007/0244766 A1 | 10/2007 | Goel |
| 2007/0244778 A1 | 10/2007 | Bailard |
| 2007/0282665 A1 | 12/2007 | Buehler et al. |
| 2007/0291118 A1 | 12/2007 | Shu et al. |
| 2007/0294706 A1 | 12/2007 | Neuhauser et al. |
| 2008/0004951 A1 | 1/2008 | Huang et al. |
| 2008/0010114 A1 | 1/2008 | Head |
| 2008/0027788 A1 | 1/2008 | Lawrence et al. |
| 2008/0033752 A1 | 2/2008 | Rodgers |
| 2008/0059282 A1 | 3/2008 | Vallier et al. |
| 2008/0059297 A1 | 3/2008 | Vallier et al. |
| 2008/0077493 A1 | 3/2008 | Geffert |
| 2008/0089107 A1 | 4/2008 | Lee et al. |
| 2008/0114633 A1 | 5/2008 | Wolf et al. |
| 2008/0147511 A1 | 6/2008 | Edwards |
| 2008/0215391 A1 | 9/2008 | Dowling et al. |
| 2008/0243626 A1 | 10/2008 | Stawar et al. |
| 2008/0249793 A1 | 10/2008 | Angell et al. |
| 2008/0249835 A1 | 10/2008 | Angell et al. |
| 2008/0249836 A1 | 10/2008 | Angell et al. |
| 2008/0249837 A1 | 10/2008 | Angell et al. |
| 2008/0249838 A1 | 10/2008 | Angell et al. |
| 2008/0249851 A1 | 10/2008 | Angell et al. |
| 2008/0249856 A1 | 10/2008 | Angell et al. |
| 2008/0249857 A1 | 10/2008 | Angell et al. |
| 2008/0249858 A1 | 10/2008 | Angell et al. |
| 2008/0249859 A1 | 10/2008 | Angell et al. |
| 2008/0249864 A1 | 10/2008 | Angell et al. |
| 2008/0249865 A1 | 10/2008 | Angell et al. |
| 2008/0249866 A1 | 10/2008 | Angell et al. |
| 2008/0249867 A1 | 10/2008 | Angell et al. |
| 2008/0249868 A1 | 10/2008 | Angell et al. |
| 2008/0249870 A1 | 10/2008 | Angell et al. |
| 2008/0270172 A1 | 10/2008 | Luff et al. |
| 2008/0270220 A1 | 10/2008 | Ramer et al. |
| 2008/0270222 A1 | 10/2008 | Goel |
| 2009/0002155 A1 | 1/2009 | Ma et al. |

(56) References Cited

U.S. PATENT DOCUMENTS

| | | |
|---|---|---|
| 2009/0005650 A1 | 1/2009 | Angell et al. |
| 2009/0006125 A1 | 1/2009 | Angell et al. |
| 2009/0006286 A1 | 1/2009 | Angell et al. |
| 2009/0006295 A1 | 1/2009 | Angell et al. |
| 2009/0037193 A1 | 2/2009 | Vempati et al. |
| 2009/0083121 A1 | 3/2009 | Angell et al. |
| 2009/0083122 A1 | 3/2009 | Angell et al. |
| 2009/0089107 A1 | 4/2009 | Angell et al. |
| 2009/0198625 A1 | 8/2009 | Walker et al. |
| 2009/0234878 A1 | 9/2009 | Herz et al. |
| 2009/0322492 A1 | 12/2009 | Hannah et al. |
| 2010/0023372 A1 | 1/2010 | Gonzalez |
| 2010/0026802 A1 | 2/2010 | Titus et al. |
| 2010/0032482 A1 | 2/2010 | Clark et al. |
| 2010/0169229 A1 | 7/2010 | Lee |
| 2010/0180029 A1 | 7/2010 | Fourman |
| 2010/0299210 A1 | 11/2010 | Giraud et al. |
| 2011/0004511 A1 | 1/2011 | Reich |
| 2012/0328263 A1 | 12/2012 | Barton et al. |
| 2013/0096966 A1 | 4/2013 | Barnes, Jr. |

FOREIGN PATENT DOCUMENTS

| | | |
|---|---|---|
| JP | 2003263544 A | 9/2003 |
| WO | 0217235 A2 | 2/2002 |
| WO | 0217235 A3 | 2/2002 |

OTHER PUBLICATIONS

Lyall, Sarah, "What's the Buzz? Roudy Teenagers Don't want to Hear it", NY Times, Nov. 29, 2005, pp. 1.*
USPTO office action for U.S. Appl. No. 11/861,590 dated Jun. 15, 2010.
USPTO office action for U.S. Appl. No. 11/861,729 dated Jun. 15, 2010.
USPTO office action for U.S. Appl. No. 11/862,306 dated Jun. 24, 2010.
USPTO office action for U.S. Appl. No. 11/695,983 dated Mar. 25, 2010.
USPTO office action for U.S. Appl. No. 11/861,520 dated May 6, 2010.
USPTO office action for U.S. Appl. No. 11/743,982 dated Mar. 24, 2010.
USPTO office action for U.S. Appl. No. 11/769,409 dated Apr. 14, 2010.
USPTO office action for U.S. Appl. No. 11/756,198 dated Apr. 22, 2010.
USPTO office action for U.S. Appl. No. 11/771,252 dated May 5, 2010.
USPTO office action for U.S. Appl. No. 11/764,524 dated Apr. 15, 2010.
USPTO office action for U.S. Appl. No. 11/861,528 dated May 13, 2010.
USPTO office action for U.S. Appl. No. 11/771,887 dated Mar. 8, 2010.
USPTO office action for U.S. Appl. No. 11/771,912 dated Apr. 8, 2010.
Wu et al. "Vehicle Sound Signature Recognition by Principle Frequency Vector Component Analysis", IEEE Instrumentation and Measurement Technology Conference, May 18-20, 1998, pp. 429-434.
Kosba, et al, "Personalized Hypermedia Presentation Techniques for Improving Online Customer Relationships", The Knowledge Engineering Review, Vo 16:2, 2001, pp. 111-155.
Ng, Cheuk-Fan, Satisfying shoppers psychological needs: From public market to cyber-mall, 2002, Journal of Environmental Psycology, 23 (2003) pp: 439-455.
U.S. Appl. No. 11/695,983, filed Apr. 3, 2007, Angell et al.
U.S. Appl. No. 11/861,520, filed Sep. 26, 2007, Angell et al.
U.S. Appl. No. 11/861,590, filed Sep. 26, 2007, Angell et al.
U.S. Appl. No. 11/861,729, filed Sep. 26, 2007, Angell et al.
U.S. Appl. No. 11/862,279, filed Sep. 27, 2007, Angell et al.
U.S. Appl. No. 11/862,294, filed Sep. 27, 2007, Angell et al.
U.S. Appl. No. 11/862,299, filed Sep. 27, 2007, Angell et al.
U.S. Appl. No. 11/862,306, filed Sep. 27, 2007, Angell et al.
U.S. Appl. No. 11/862,323, filed Sep. 27, 2007, Angell et al.
U.S. Appl. No. 11/743,982, filed May 3, 2007, Angell et al.
U.S. Appl. No. 11/744,024, filed May 3, 2007, Angell et al.
U.S. Appl. No. 11/769,409, filed Jun. 27, 2007, Angell et al.
U.S. Appl. No. 11/756,198, filed May 31, 2007, Angell et al.
U.S. Appl. No. 11/771,252, filed Jun. 29, 2007, Angell et al.
U.S. Appl. No. 11/764,524, filed Jun. 18, 2007, Angell et al.
U.S. Appl. No. 11/861,528, filed Sep. 26, 2007, Angell et al.
U.S. Appl. No. 11/862,374, filed Sep. 27, 2007, Angell et al.
U.S. Appl. No. 11/771,887, filed Jun. 29, 2007, Angell et al.
U.S. Appl. No. 11/771,912, filed Jun. 29, 2007, Angell et al.
U.S. Appl. No. 11/861,966, filed Sep. 26, 2007, Angell et al.
U.S. Appl. No. 11/861,975, filed Sep. 26, 2007, Angell et al.
Knuchel et al., "A Learning based approach for anonymous Recommendation", Proceedings of the 8th IEEE International Conference on E-Commerce Technology and the 3rd IEEE International Conference on Enterprise Computing, E-Commerce and E-Services, 2006, pp. 1-8.
USPTO office action for U.S. Appl. No. 11/743,982 dated Aug. 19, 2010.
USPTO final office action for U.S. Appl. No. 11/756,198 dated Aug. 31, 2010.
USPTO office action for U.S. Appl. No. 11/862,374 dated Aug. 19, 2010.
USPTO final office action for U.S. Appl. No. 11/769,409 dated Aug. 31, 2010.
USPTO final office action for U.S. Appl. No. 11/771,912 dated Jul. 21, 2010.
USPTO final office action for U.S. Appl. No. 11/861,528 dated Sep. 9, 2010.
USPTO Notice of allowance for U.S. Appl. No. 11/771,887 dated Sep. 2, 2010.
Office Action issued on Sep. 4, 2012 for U.S. Appl. No. 11/771,884, 16 pages.
Office Action issued on Oct. 4, 2012 for U.S. Appl. No. 11/861,966, 68 pages.
USPTO office action for U.S. Appl. No. 11/744,024 dated Mar. 4, 2011.
USPTO office action for U.S. Appl. No. 11/861,966 dated Feb. 4, 2011.
USPTO office action for U.S. Appl. No. 11/862,323 dated Feb. 17, 2011.
USPTO office action for U.S. Appl. No. 11/862,299 dated Feb. 24, 2011.
USPTO office action for U.S. Appl. No. 11/862,279 dated Feb. 4, 2011.
Jones, "What is your risk score", In These Times, May 28, 2003, p. 1-3.
USPTO office action for U.S. Appl. No. 11/861,975 dated Dec. 22, 2010.
USPTO final office action for U.S. Appl. No. 11/861,975 dated Jun. 6, 2011.
USPTO Office Action dated Jul. 19, 2011 for U.S. Appl. No. 11/863,279.
"CRM Marketing Initiatives," In: The CRM Handbook: A Business Guide to Customer Relationship Management, Dyche (Ed.), Addison-Wesley Professional, Aug. 9, 2001, excerpt from http://academic.safaribooksonline.com/print?xmlid=0-201-73062-6/ch02lev1sec3, downloaded Jan. 23, 2012, 13 pages.
"Infogrames Brings Sense of Touch to Web Sites with Immersion Technology," Immersion Corporation, May 22, 2000, 2 pages.
Anupam et al., "Personalizing the Web Using Site Descriptions," Proceedings of the 10th International Workshop on Database and Expert Systems Applications, Florence, Italy, Sep. 1-3, 1999, pp. 732-738.
Collins et al., "A System for Video Surveillance and Monitoring," Technical Report CMU-RI-TR-00-12, Robotics Institute, Carnegie Mellon University, May 2000, 69 pages.

(56) References Cited

OTHER PUBLICATIONS

Greiffenhagen et al., "Design, Analysis, and Engineering of Video Monitoring Systems: An Approach and a Case Study," Proceedings of the IEEE, 89(10):1498-1517, Oct. 2001.

Hampapur et al., "Smart Video Surveillance—Exploring the Concept of Multiscale Spatiotemporal Tracking," IEEE Signal Processing Magazine, 22(2):38-51, Mar. 2005.

Lipton et al., "Critical Asset Protection, Perimeter Monitoring, and Threat Detection Using Automated Video Surveillance," Proceedings of the 36th Annual International Carnahan Conference on Security Technology, Dec. 2002, pp. 1-11.

Sandler, "Tavern Camera Mandate Proposed: Milwaukee Alderman Hopes to Log Evidence of Misbehavior, Crime," Knight Ridder Tribune Business News, Washington, D.C., Oct. 4, 2006, http://proquest.umi.com/pdqweb?index=2&did=1139882851&SrchMode=2&sid=1&Fmt=, accessed Aug. 12, 2011, 2 pages.

Office Action regarding U.S. Appl. No. 09/761,121, dated Mar. 3, 2004, 9 pages.

Final Office Action regarding U.S. Appl. No. 09/761,121, dated Nov. 24, 2004, 6 pages.

Office Action regarding U.S. Appl. No. 09/761,121, dated May 24, 2005, 8 pages.

Final Office Action regarding U.S. Appl. No. 09/761,121, dated Nov. 16, 2005, 8 pages.

Appeal Brief regarding U.S. Appl. No. 09/761,121, dated May 3, 2006, 12 pages.

Amended Appeal Brief regarding U.S. Appl. No. 09/761,121, dated Jul. 31, 2006, 12 pages.

Second Amended Appeal Brief regarding U.S. Appl. No. 09/761,121, dated Sep. 1, 2006, 14 pages.

Third Amended Appeal Brief regarding U.S. Appl. No. 09/761,121, dated Dec. 18, 2006, 16 pages.

Examiner's Answer regarding U.S. Appl. No. 09/761,121, dated Mar. 21, 2007, 10 pages.

Order Remanding Appeal to Examiner regarding U.S. Appl. No. 09/761,121, dated Dec. 3, 2008, 2 pages.

Second Examiner's Answer regarding U.S. Appl. No. 09/761,121, dated Dec. 9, 2008, 12 pages.

Reply Brief regarding U.S. Appl. No. 09/761,121, dated Feb. 6, 2009, 3 pages.

Decision on Appeal regarding U.S. Appl. No. 09/761,121, dated Feb. 17, 2010, 11 pages.

Office Action regarding U.S. Appl. No. 09/761,121, dated Jun. 10, 2010, 10 pages.

Final Office Action regarding U.S. Appl. No. 09/761,121, dated Oct. 25, 2010, 8 pages.

Appeal Brief regarding U.S. Appl. No. 09/761,121, dated Feb. 18, 2011, 11 pages.

Examiner's Answer regarding U.S. Appl. No. 09/761,121, dated May 5, 2011, 10 pages.

Notice of Allowance regarding U.S. Appl. No. 10/918,521, dated Sep. 27, 2006, 11 pages.

Office Action regarding U.S. Appl. No. 11/455,251, dated Dec. 10, 2010, 7 pages.

Final Office Action regarding U.S. Appl. No. 11/455,251, dated Apr. 27, 2011, 5 pages.

Office Action regarding U.S. Appl. No. 11/744,024, dated Sep. 28, 2010, 37 pages.

Final Office Action regarding U.S. Appl. No. 11/764,524, dated Aug. 19, 2010, 25 pages.

Appeal Brief regarding U.S. Appl. No. 11/764,524, dated Jan. 11, 2011, 24 pages.

Examiner's Answer regarding U.S. Appl. No. 11/764,524, dated Apr. 15, 2011, 21 pages.

Reply Brief regarding U.S. Appl. No. 11/764,524, dated Jun. 8, 2011, 9 pages.

Final Office Action regarding U.S. Appl. No. 11/743,982, dated Jan. 31, 2011, 14 pages.

Appeal Brief regarding U.S. Appl. No. 11/743,982, dated Jun. 23, 2011, 31 pages.

Examiner's Answer regarding U.S. Appl. No. 11/743,982, dated Sep. 16, 2011, 17 pages.

Reply Brief regarding U.S. Appl. No. 11/743,982, dated Nov. 16, 2011, 7 pages.

Appeal Brief regarding U.S. Appl. No. 11/769,409, dated Nov. 30, 2010, 38 pages.

Examiner's Answer regarding U.S. Appl. No. 11/769,409, dated Feb. 17, 2011, 22 pages.

Reply Brief reagrding U.S. Appl. No. 11/769,409, dated Apr. 4, 2011, 16 pages.

Final Office Action regarding U.S. Appl. No. 11/771,252, dated Oct. 15, 2010, 20 pages.

Office Action regarding U.S. Appl. No. 11/771,860, dated Sep. 29, 2010, 15 pages.

Final Office Action regarding U.S. Appl. No. 11/771,860, dated Mar. 1, 2011, 13 pages.

Appeal Brief regarding U.S. Appl. No. 11/781,860. dated Jul. 28, 2011, 24 pages.

Office Action regarding U.S. Appl. No. 11/781,860, dated Nov. 17, 2011, 14 pages.

Final Office Action regarding U.S. Appl. No. 11/781,860, dated May 24, 2012, 14 pages.

Office Action regarding U.S. Appl. No. 11/771,884, dated Sep. 23, 2010, 15 pages.

Final Office Action regarding U.S. Appl. No. 11/771,884, dated Mar. 18, 2011, 13 pages.

Appeal Brief regarding U.S. Appl. No. 11/771,884, dated Jun. 15, 2011, 30 pages.

Office Action regarding U.S. Appl. No. 11/771,884, dated Aug. 17, 2011, 14 pages.

Response to Office Action regarding U.S. Appl. No. 11/862,279, dated May 4, 2011, 18 pages.

Amendment Pursuant to Request for Continued Examination regarding U.S. Application No. 11/862,279, dated Oct. 13, 2011, 16 pages.

Response to Office Action regarding U.S. Appl. No. 11/862,306, dated Sep. 24, 2010, 15 pages.

Final Office Action regarding U.S. Appl. No. 11/862,306, dated Dec. 3, 2010, 26 pages.

Amendment Pursuant to Request for Continued Examination regarding U.S. Appl. No. 11/862,306, dated Feb. 23, 2011, 16 pages.

Bestavros, "Banking Industry Walks 'Tightrope' in Personalization of Web Services," Bank Systems & Technology, 37(1):54, Jan. 2000.

Kuhn, "Affinity Architecture: Towards a Model for Planning and Designing Comprehensively Personalised Web Applications," Journal of AGASI, pp. 60-63, Jul. 1999.

Mitchell, "Computerizing Video Surveillance Techniques," IBM Technical Disclosure Bulletin, n5 10-92, pp. 403, Oct. 1, 1992.

"Software Models," Excel Software, http://web.archive.org/web/19990203054425/excelsoftware.com/models.hml, Oct. 1996, 11 pages.

"Software Prototyping," University of Houston, Sep. 22, 2008, 32 pages.

Examiner's Answer regarding U.S. Appl. No. 11/862,374, dated Aug. 16, 2012, 44 pages.

Non-final office action dated Mar. 15, 2013 regarding U.S. Appl. No. 11/862,323, 23 pages.

Final office action dated Mar. 28, 2013 regarding U.S. Appl. No. 11/771,860, 44 pages.

Lyall, "What's the Buzz? Rowdy Teenagers Don't Want to Hear It," Barry Journal, The New York Times, Nov. 2005, 1 page.

Non-final office action dated Sep. 26, 2013 regarding U.S. Appl. No. 11/756,198, 68 ages.

Non-final office action dated Sep. 18, 2013 regarding U.S. Appl. No. 11/771,252, 70 pages.

Non-final office action dated Jul. 18, 2013 regarding U.S. Appl. No. 11/862,279, 60 pages.

Non-final office action dated Oct. 15, 2013 regarding U.S. Appl. No. 11/862,306, 67 pages.

Non-final office action dated Aug. 19, 2013 regarding U.S. Appl. No. 11/862,323, 40 pages.

Notice of allowance dated Sep. 13, 2013 regarding U.S. Appl. No. 11/769,409, 39 pages.

(56) References Cited

OTHER PUBLICATIONS

Non-final office action dated Sep. 17, 2013 regarding U.S. Appl. No. 11/695,983, 76 pages.
Final Office Action regarding U.S. Appl. No. 11/771,884, dated Feb. 28, 2012, 17 pages.
Appeal Brief regarding U.S. Appl. No. 11/771,884, dated May 29, 2012, 50 pages.
Notice of Allowance regarding U.S. Appl. No. 11/771,912, dated Nov. 5, 2010, 12 pages.
Response to Office Action regarding U.S. Appl. No. 11/861,520, dated Aug. 6, 2010, 15 pages.
Final Office Action regarding U.S. Appl. No. 11/861,520, dated Oct. 28, 2010, 26 pages.
Appeal Brief regarding U.S. Appl. No. 11/861,520, dated Mar. 22, 2011, 34 pages.
Examiner's Answer regarding U.S. Appl. No. 11/861,520, dated Jun. 9, 2011, 31 pages.
Reply Brief regarding U.S. Appl. No. 11/881,520, dated Aug. 48, 2011, 6 pages.
Appeal Brief regarding U.S. Appl. No. 11/861,528, dated Nov. 30, 2010, 33 pages.
Examiner's Answer regarding U.S. Appl. No. 11/861,528, dated Feb. 17, 2011, 22 pages.
Reply Brief regarding U.S. Appl. No. 11/861,528, dated Mar. 25, 2011, 8 pages.
Response to Office Action regarding U.S. Appl. No. 11/861,590, dated Sep. 14, 2010, 12 pages.
Final Office Action regarding U.S. Appl. No. 11/861,590, dated Nov. 18, 2010, 31 pages.
Appeal Brief regarding U.S. Appl. No. 11/861,590, dated Apr. 11, 2011, 35 pages.
Examiner's Answer regarding U.S. Appl. No. 11/861,590, dated Jul. 1, 2011, 29 pages.
Reply Brief regarding U.S. Appl. No. 11/861,590, dated Aug. 30, 2011, 4 pages.
Response to Office Action regarding U.S. Appl. No. 11/861,729, dated Sep. 14, 2010, 15 pages.
Final Office Action regarding U.S. Appl. No. 11/861,729, dated Nov. 18, 2010, 38 pages.
Appeal Brief regarding U.S. Appl. No. 11/861,729, dated Apr. 11, 2011, 35 pages.
Examiner's Answer regarding U.S. Appl. No. 11/861,729, dated Jul. 6, 2011, 35 pages.
Reply Brief regarding U.S. Appl. No. 11/861,729, dated Aug. 31, 2011, 5 pages.
Final Office Action regarding U.S. Appl. No. 11/861,966, dated Jul. 22, 2011, 21 pages.
Appeal Brief regarding U.S. Appl. No. 11/861,975, dated Nov. 2, 2011, 48 pages.
Notice of Allowance regarding U.S. Appl. No. 11/861,975, dated Feb. 3, 2012, 14 pages.
Office Action regarding U.S. Appl. No. 11/862,294, dated May 13, 2010, 19 pages.
Response to Office Action regarding U.S. Appl. No. 11/862,294, dated Aug. 13, 2010, 15 pages.
Office Action regarding U.S. Appl. No. 11/862,294, dated Nov. 1, 2010, 25 pages.
Response to Office Action regarding U.S. Appl. No. 11/862,294, dated Jan. 27, 2011, 15 pages.
Examiner's Interview Summary regarding U.S. Appl. No. 11/862,294, dated Jan. 31, 2011, 3 pages.
Final Office Action regarding U.S. Appl. No. 11/862,294, dated Apr. 14, 2011, 23 pages.
Appeal Brief regarding U.S. Appl. No. 11/862,294, dated Jul. 21, 2011, 39 pages.
Examiner's Answer regarding U.S. Appl. No. 11/862,294, dated Oct. 28, 2011, 27 pages.
Reply Brief regarding U.S. Appl. No. 11/862,294, dated Dec. 6, 2011, 14 pages.
Response to Office Action regarding U.S. Appl. No. 11/862,299, dated May 24, 2011, 17 pages.
Final Office Action regarding U.S. Appl. No. 11/862,299, dated Aug. 18, 2011, 25 pages.
Appeal Brief regarding U.S. Appl. No. 11/862,299, dated Jan. 11, 2012, 38 pages.
Office Action regarding U.S. Appl. No. 11/862,323, dated Sep. 3, 2010, 26 pages.
Response to Office Action regarding U.S. Appl. No. 11/862,323, dated Dec. 2, 2010, 15 pages.
Response to Office Action regarding U.S. Appl. No. 11/862,323, dated May 17, 2011, 23 pages.
Final Office Action regarding U.S. Appl. No. 11/862,323, dated Aug. 19, 2011, 21 pages.
Appeal Brief regarding U.S. Appl. No. 11/862,323, dated Jan. 10, 2012, 29 pages.
Final Office Action regarding U.S. Appl. No. 11/862,374, dated Jan. 28, 2011, 34 pages.
Final Office Action regarding U.S. Appl. No. 11/862,374, dated May 12, 2011, 31 pages.
Appeal Brief regarding U.S. Appl. No. 11/862,374, dated Jul. 15, 2011, 39 pages.
Office Action regarding U.S. Appl. No. 11/862,374, dated Aug. 31, 2011, 37 pages.
Final Office Action regarding U.S. Appl. No. 11/862,374, dated Jan. 4, 2012, 36 pages.
Appeal Brief regarding U.S. Appl. No. 11/862,374, dated Jun. 4, 2012, 34 pages.
Response to Office Action regarding U.S. Appl. No. 11/695,983, dated Apr. 27, 2010, 14 pages.
Final Office Action regarding U.S. Appl. No. 11/695,983, dated Jul. 7, 2010, 23 pages.
Amendment Pursuant to Request for Continued Examination regarding U.S. Appl. No. 11/695,983, dated Sep. 29, 2010, 13 pages.

* cited by examiner

| RISK ASSESSMENT SCORE | |
|---|---|
| 1102 — CREDIT SCORE | ## |
| 1104 — REVENUE PER TRANSACTION | ## |
| 1106 — COUPONS/DISCOUNTS/PRICE MATCHING | ## |
| 1108 — SALE ITEMS PER TRANSACTION/PRICE SENSITIVITY | ## |
| 1110 — NAME BRANDS v. GENERIC BRANDS | ## |
| 1112 — SHOPLIFTING/CRIMINAL HISTORY | ## |
| 1114 — CUSTOMER HISTORY/CUSTOMER LOYALTY | ## |
| 1116 — CUSTOMER INCOME | ## |
| 1118 — FREQUENCY OF TRANACTIONS/REGULARITY OF PATRONAGE | ## |
| 1120 — PRODUCT RETURNS | ## |
| 1122 — CUSTOMER COMPLAINTS | ## |
| 1124 — TOTAL RISK ASSESSMENT SCORE | ## |

*FIG. 11*

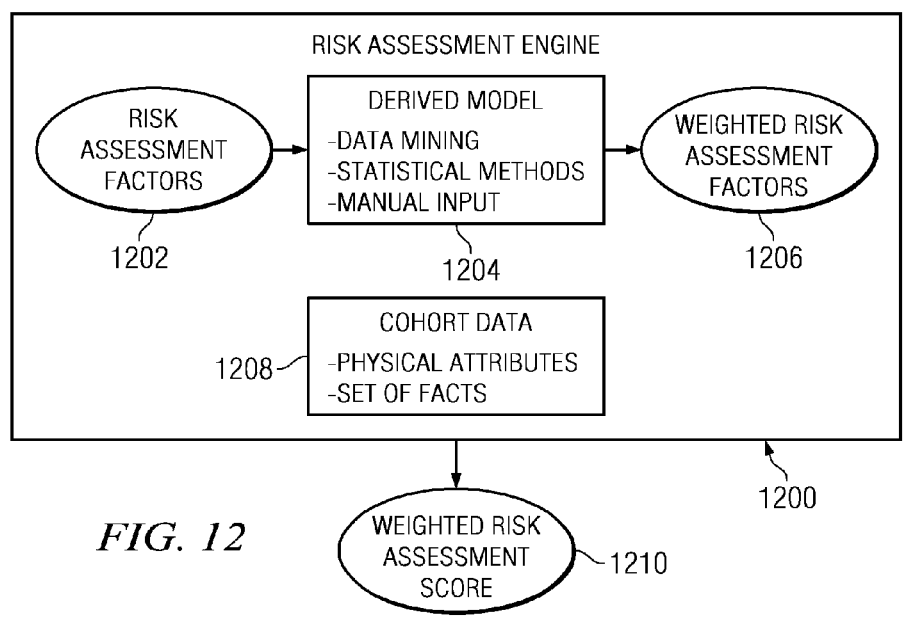

*FIG. 12*

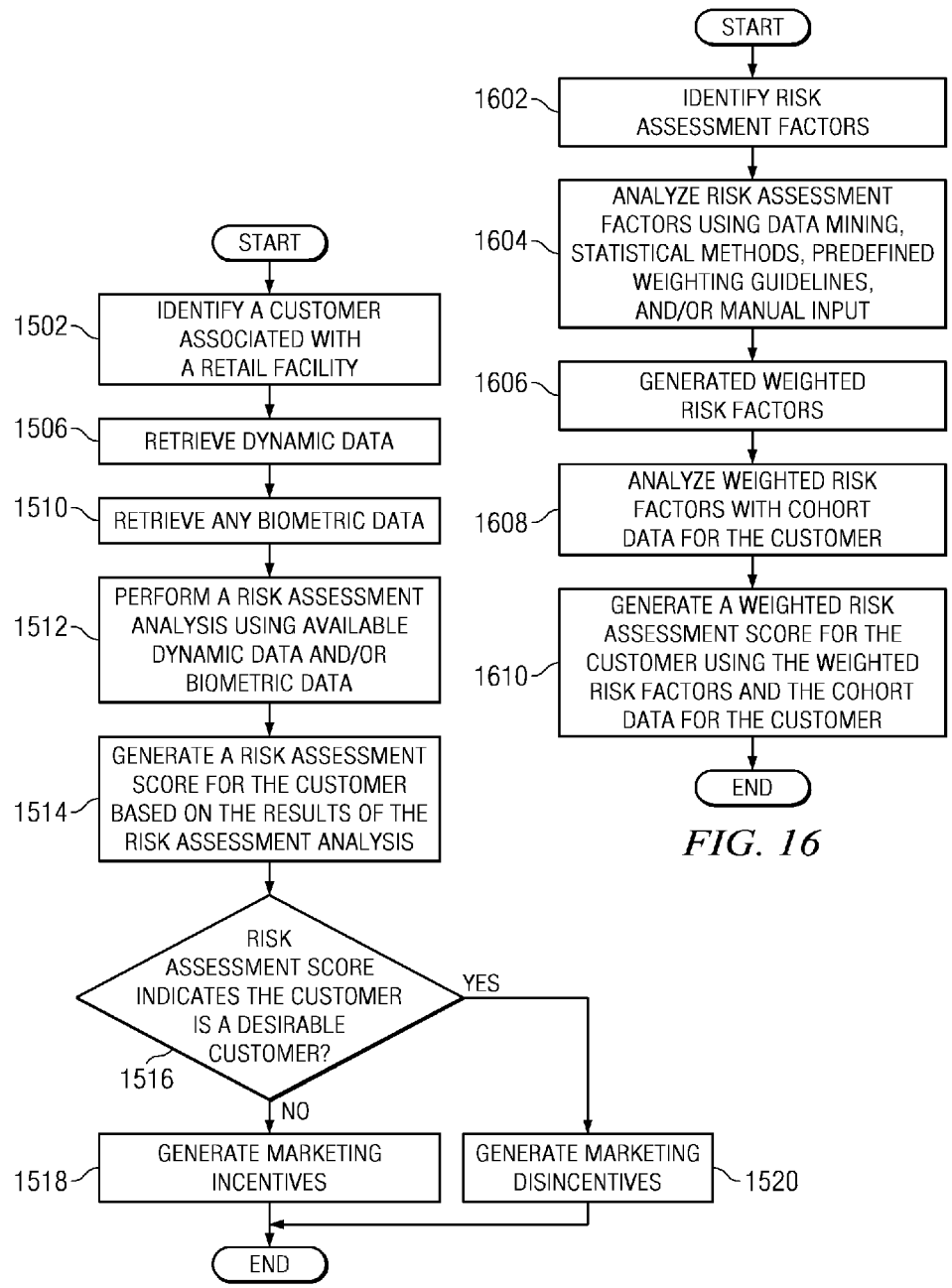

GENERATING CUSTOMIZED DISINCENTIVE MARKETING CONTENT FOR A CUSTOMER BASED ON CUSTOMER RISK ASSESSMENT

CROSS-REFERENCE TO RELATED APPLICATIONS

This application is a continuation-in-part of patent application U.S. Ser. No. 11/695,983, filed Apr. 3, 2007, titled "Method and Apparatus for Providing Customized Digital Media Marketing Content Directly to a Customer", which is incorporated herein by reference.

The present invention is also related to the following applications entitled Identifying Significant Groupings of Customers for Use in Customizing Digital Media Marketing Content Provided Directly to a Customer, application Ser. No. 11/744,024, filed May 3, 2007; Generating Customized Marketing Messages at a Customer Level Using Current Events Data, application Ser. No. 11/769,409, file Jun. 24, 2007; Generating Customized Marketing Messages Using Automatically Generated Customer Identification Data, application Ser. No. 11/756,198, filed May 31, 2007; Generating Customized Marketing Messages for a Customer Using Dynamic Customer Behavior Data, application Ser. No. 11/771,252, filed Jun. 29, 2007, Retail Store Method and System, Robyn Schwartz, Publication No. US 2006/0032915 A1 (filed Aug. 12, 2004); Business Offering Content Delivery, Robyn R. Levine, Publication No. US 2002/0111852 (filed Jan. 16, 2001) all assigned to a common assignee, and all of which are incorporated herein by reference.

BACKGROUND OF THE INVENTION

1. Field of the Invention

The present invention is related generally to an improved data processing system, and in particular to a method and apparatus for processing digital video data. More particularly, the present invention is directed to a computer implemented method, apparatus, and computer usable program product for presenting marketing disincentives to a customer based on a risk assessment score for the customer.

2. Description of the Related Art

In the past, merchants frequently had a personal relationship with their customers. The merchant often knew their customers' names, address, marital status, ages of their children, hobbies, place of employment, character, anniversaries, birthdays, likes, dislikes and personal preferences. The merchant was able to use this information to cater to customer needs and push sales of items the customer might be likely to purchase based on the customer's personal situation. The merchant was also able to determine whether a customer was a good customer that should receive special marketing efforts, a credit risk or bad customer that should not receive special marketing offers, or a customer that posed a risk or threat to the store or other customers based on the merchant's personal knowledge of the customer's character, reputation, and criminal history.

However, with the continued growth of large cities, the corresponding disappearance of small, rural towns, and the increasing number of large, impersonal chain stores with multiple employees, the merchants and employees of retail businesses rarely recognize regular customers, and almost never know the customer's name or any other details regarding their customer's personal preferences that might assist the merchant or employee in marketing efforts directed toward a particular customer.

One solution to this problem is directed toward using data mining techniques to gather customer profile data. The customer profile data is used to generate marketing strategies for marketing products to customers. Customer profile data typically includes information provided by the customer in response to a questionnaire or survey, such as the name, address, telephone number, and gender of customers, as well as products preferred by the customer. Demographic data regarding a customer's age, sex, income, career, interests, hobbies, and consumer preferences may also be included in customer profile data.

However, these methods only provide limited and generalized marketing strategies that are directed towards a fairly large segment of the population without taking into account actual customer reactions to product placement in a particular retail store or to other environmental factors that may influence product purchases by customers.

In an attempt to better monitor customers in large retail stores, these stores frequently utilize cameras and other audio and/or video monitoring devices to record customers inside the retail store or in the parking lot. A store detective may watch one or more monitors displaying closed circuit images of customers in various areas inside the store to identify shoplifters. However, these solutions require a human user to review the audio and video recordings. In addition, the video and audio recordings are typically used only for store security.

Thus, current solutions do not utilize all of the potential dynamic customer data elements that may be available for identifying customers that should be marketed to, customers that should be encouraged to shop at the retail facility, customers that should not receive marketing content, and customers that should be discouraged from shopping at the retail facility. The data elements currently being utilized to generate marketing strategies only provide approximately seventy-five percent (75%) of the needed customer data.

SUMMARY OF THE INVENTION

The illustrative embodiments provide a computer implemented method, apparatus, and computer usable program product for managing a level of marketing disincentives directed towards a customer using a risk assessment score. In one embodiment, a risk assessment score for a customer associated with a retail facility is retrieved. The risk assessment score is analyzed to determine whether the customer is a desirable customer or an undesirable customer. In response to the risk assessment score indicating that the customer is an undesirable customer, aggressive marketing disincentives targeted to the undesirable customer are generated. If the risk assessment score indicates the customer is a desirable customer, marketing incentives targeted to the desirable customer are generated.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 11 is a block diagram illustrating a set of risk assessment factors used to generate a risk assessment score for a customer in accordance with an illustrative embodiment;

FIG. 12 is a block diagram illustrating a risk assessment engine for generating a risk assessment score for a customer in accordance with an illustrative embodiment;

FIG. 15 is a flowchart illustrating a process for identifying an undesirable customer in accordance with an illustrative embodiment;

FIG. 16 is a flowchart illustrating a process for generating a risk assessment score in accordance with an illustrative embodiment;

DETAILED DESCRIPTION OF THE PREFERRED EMBODIMENT

Figure 1:
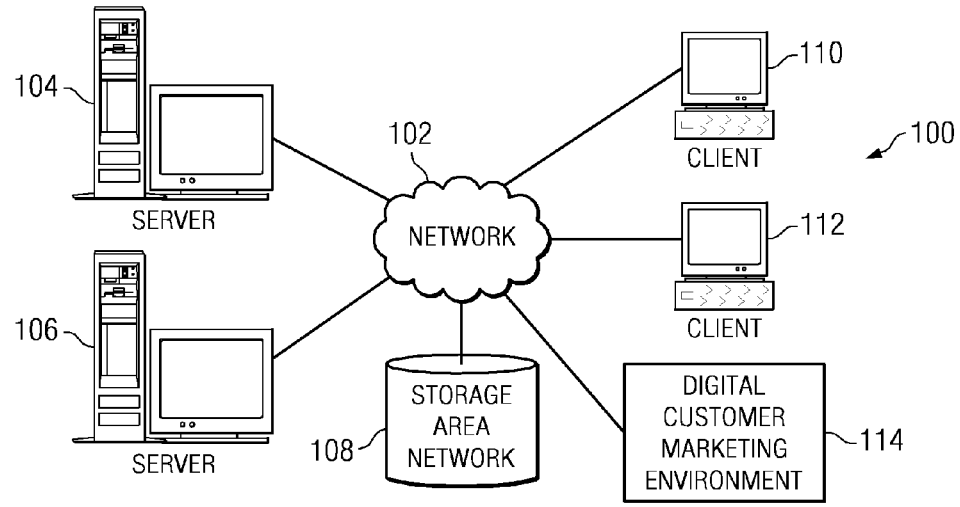
FIG. 1 is a pictorial representation of a network of data processing systems in which illustrative embodiments may be implemented.
Figure 2:
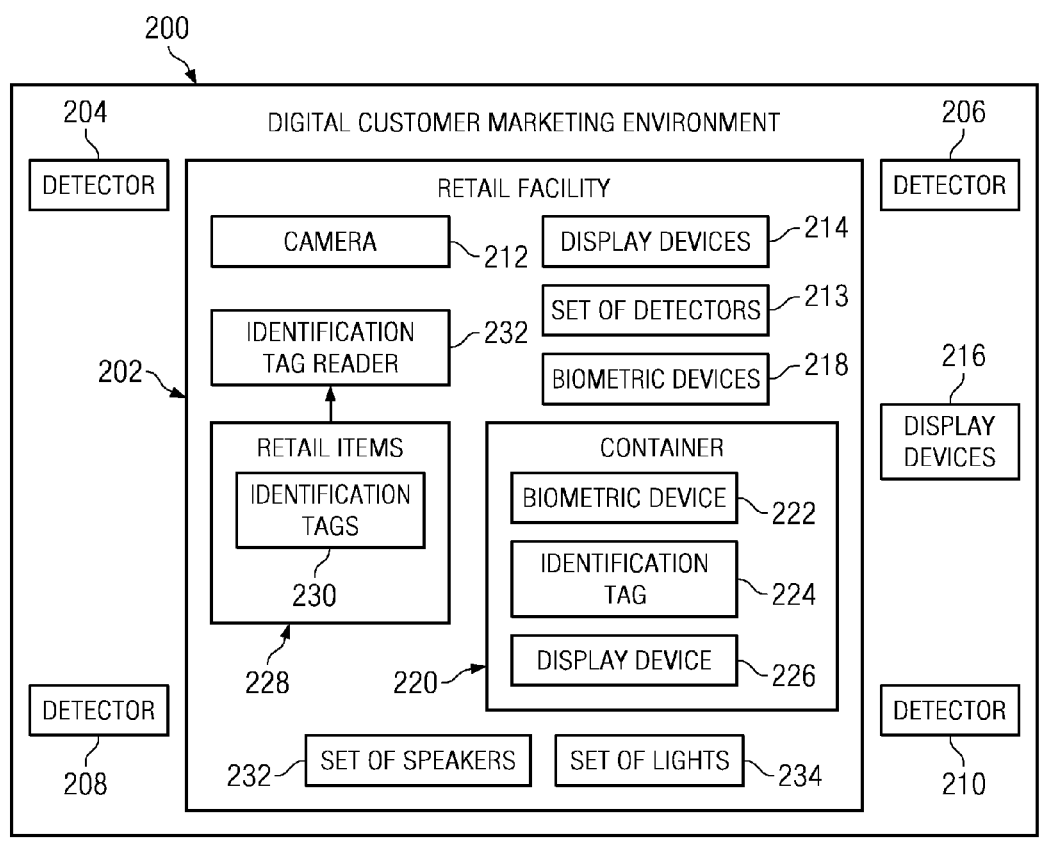
FIG. 2 is a block diagram of a digital customer marketing environment in which illustrative embodiments may be implemented.
Figure 3:
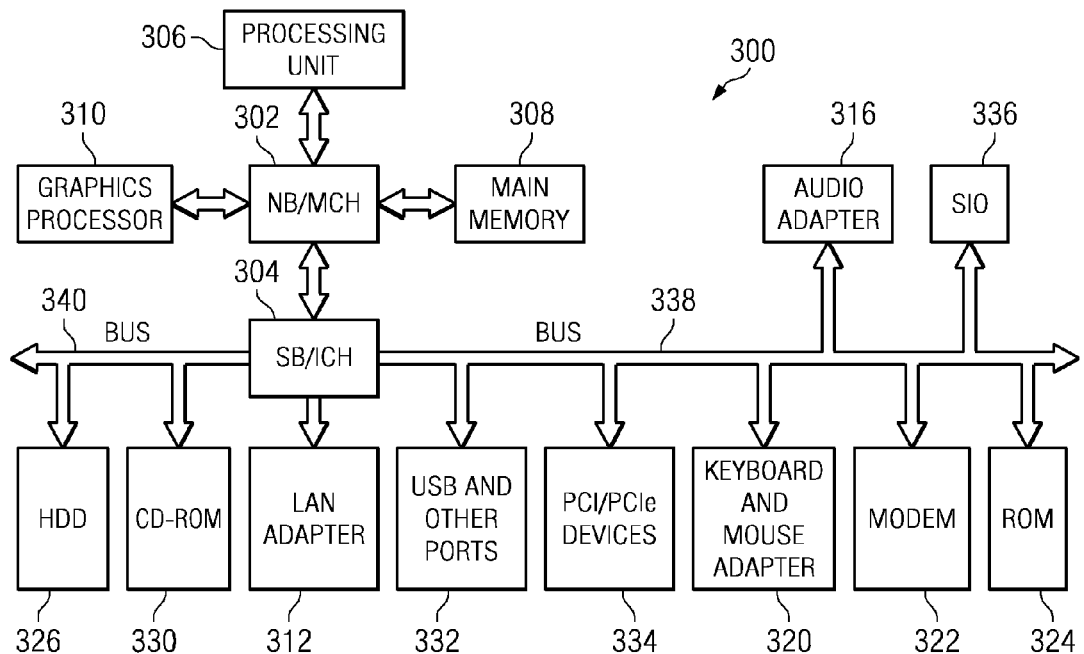
FIG. 3 is a block diagram of a data processing system in which illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage area network (SAN) 108. Storage area network 108 is a network connecting one or more data storage devices to one or more servers, such as servers 104 and 106. A data storage device, may include, but is not limited to, tape libraries, disk array controllers, tape drives, flash memory, a hard disk, and/or any other type of storage device for storing data. Storage area network 108 allows a computing device, such as client 110 to connect to a remote data storage device over a network for block level input/output.

In addition, clients 110 and 112 connect to network 102. These clients 110 and 112 may be, for example, personal computers or network computers. In the depicted example, server 104 provides data, such as boot files, operating system images, and applications to clients 110 and 112. Clients 110 and 112 are clients to server 104 in this example.

Digital customer marketing environment 114 is a retail environment that is connected to network 102. A customer may view, select order, and/or purchase one or more items in digital customer marketing environment 114. Digital customer marketing environment 114 may include one or more facilities, buildings, or other structures for wholly or partially containing items.

The items in digital customer marketing environment 114 may include, but are not limited to, consumables, comestibles, clothing, shoes, toys, cleaning products, household items, machines, any type of manufactured items, entertainment and/or educational materials, as well as entrance or admittance to attend or receive an entertainment or educational activity or event. Items for purchase could also include services, such as, without limitation, dry cleaning services, food delivery services, automobile repair services, vehicle detailing services, personal grooming services, such as manicures and haircuts, cooking demonstrations, or any other services.

Comestibles include solid, liquid, and/or semi-solid food and beverage items. Comestibles may be, but are not limited to, meat products, dairy products, fruits, vegetables, bread, pasta, pre-prepared or ready-to-eat items, as well as unprepared or uncooked food and/or beverage items. For example, a comestible includes, without limitation, a box of cereal, a steak, tea bags, a cup of tea that is ready to drink, popcorn, pizza, candy, or any other edible food or beverage items.

An entertainment or educational activity, event, or service may include, but is not limited to, a sporting event, a music concert, a seminar, a convention, a movie, a ride, a game, a theatrical performance, and/or any other performance, show, or spectacle for entertainment or education of customers. For example, entertainment or educational activity or event could include, without limitation, the purchase of seating at a football game, purchase of a ride on a roller coaster, purchase of a manicure, or purchase of admission to view a film.

Digital customer marketing environment 114 may also includes a parking facility for parking cars, trucks, motorcycles, bicycles, or other vehicles for conveying customers to and from digital customer marketing environment 114. A parking facility may include an open air parking lot, an underground parking garage, an above ground parking garage, an automated parking garage, and/or any other area designated for parking customer vehicles.

For example, digital customer marketing environment 114 may be, but is not limited to, a grocery store, a retail store, a department store, an indoor mall, an outdoor mall, a combination of indoor and outdoor retail areas, a farmer's market, a convention center, a sports arena or stadium, an airport, a bus depot, a train station, a marina, a hotel, fair grounds, an amusement park, a water park, and/or a zoo.

Digital customer marketing environment 114 encompasses a range or area in which marketing messages may be transmitted to a digital display device for presentation to a customer within digital customer marketing environment. Digital multimedia management software is used to manage and/or enable generation, management, transmission, and/or display of marketing messages within digital customer marketing environment. Examples of digital multimedia management software include, but are not limited to, Scala® digital media/digital signage software, EK3® digital media/digital signage software, and/or Allure digital media software.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as, without limitation, an intranet, an Ethernet, a local area network (LAN), and/or a wide area network (WAN).

Network data processing system 100 may also include additional data storage devices in addition to or instead of storage area network 108, such as, without limitation, one or more hard disks, compact disks (CD), compact disk rewritable (CD-RW), flash memory, compact disk read-only memory (CD ROM), non-volatile random access memory (NV-RAM), and/or any other type of storage device for storing data.

FIG. 1 is intended as an example, and not as an architectural limitation for different embodiments. Network data processing system 100 may include additional servers, clients, data storage devices, and/or other devices not shown. For example, server 104 may also include devices not depicted in FIG. 1, such as, without limitation, a local data storage device.

In another embodiment, digital customer marketing environment 114 includes one or more servers located on-site at digital customer marketing environment. In this example, network 102 is optional. In other words, if one or more servers and/or data processing systems are located at digital customer marketing environment 114, the illustrative embodiments are capable of being implemented without requiring a network connection to computers located remotely to digital customer marketing environment 114.

A merchant, owner, operator, manager or other employee associated with digital customer marketing environment 114 typically wants to market products or services to customers in the most convenient and efficient manner possible so as to maximize resulting purchases by the customer and increase sales, profits, and/or revenue. Therefore, the aspects of the illustrative embodiments recognize that it is advantageous for the merchant to have as much information as possible describing one or more customers and to anticipate items that the customer may wish to purchase prior to the customer selecting those items for purchase in order to identify the best items to market to the customer and personalize the merchant's marketing strategy to that particular customer.

Therefore, the illustrative embodiments provide a computer implemented method, apparatus, and computer program product for managing a level of marketing disincentives directed towards a customer using a risk assessment score. In one embodiment, a risk assessment score for a customer associated with a retail facility is retrieved. The risk assessment score is analyzed to determine whether the customer is a desirable customer or an undesirable customer. In response to the risk assessment score indicating that the customer is an undesirable customer, aggressive marketing disincentives targeted to the undesirable customer are generated. If the risk assessment score indicates the customer is a desirable customer, marketing incentives targeted to the desirable customer are generated.

FIG. 2 is a block diagram of a digital customer marketing environment in which illustrative embodiments may be implemented. Digital customer marketing environment 200 is a marketing environment, such as digital customer marketing environment 114 in FIG. 1.

Retail facility 202 is a facility for wholly or partially storing, enclosing, or displaying items for marketing, viewing, selection, order, and/or purchase by a customer. For example, retail facility 202 may be, without limitation, a retail store, supermarket, grocery store, a marketplace, a food pavilion, a book store, clothing store, department store, or shopping mall. Retail facility 202 may also include, without limitation, a sports arena, amusement park, water park, convention center, trade center, or any other facility for housing, storing, displaying, offering, providing, and/or selling items. In this example, retail facility 202 is a grocery store or a department store.

Detectors 204-210 are devices for gathering data associated with a set of customers, including, but not limited to, at least one camera, motion sensor device/motion detector, sonar detection device, microphone, sound/audio recording device, audio detection device, a voice recognition system, a heat sensor/thermal sensor, a seismograph, a pressure sensor, a device for detecting odors, scents, and/or fragrances, a radio frequency identification (RFID) tag reader, a global positioning system (GPS) receiver, and/or any other detection device for detecting a presence of a human, animal, object, and/or vehicle located outside of retail facility 202. A set of customers is a set of one or more customers. A vehicle is any type of vehicle for conveying people, animals, or objects to a destination. A vehicle may include, but is not limited to, a car, bus, truck, motorcycle, boat, airplane, or any other type of vehicle.

A heat sensor is any known or available device for detecting heat, such as, but not limited to, a thermal imaging device for generating images showing thermal heat patterns. A heat sensor can detect body heat generated by a human or animal and/or heat generated by a vehicle, such as an automobile or a motorcycle. A set of heat sensors may include one or more heat sensors.

A motion detector may be implemented in any type of known or available motion detector device. A motion detector device may include, but is not limited to, one or more motion detector devices using a photo-sensor, radar or microwave radio detector, or ultrasonic sound waves.

A motion detector using ultrasonic sound waves transmits or emits ultrasonic sound waves. The motion detector detects or measures the ultrasonic sound waves that are reflected back to the motion detector. If a human, animal, or other object moves within the range of the ultrasonic sound waves generated by the motion detector, the motion detector detects a change in the echo of sound waves reflected back. This change in the echo indicates the presence of a human, animal, or other object moving within the range of the motion detector.

In one example, a motion detector device using a radar or microwave radio detector may detect motion by sending out a burst of microwave radio energy and detecting the same microwave radio waves when the radio waves are deflected back to the motion detector. If a human, animal, or other object moves into the range of the microwave radio energy field generated by the motion detector, the amount of energy reflected back to the motion detector is changed. The motion detector identifies this change in reflected energy as an indication of the presence of a human, animal, or other object moving within the motion detectors range.

A motion detector device, using a photo-sensor, detects motion by sending a beam of light across a space into a photo-sensor. The photo-sensor detects when a human, animal, or object breaks or interrupts the beam of light as the human, animal, or object by moving in-between the source of the beam of light and the photo-sensor. These examples of motion detectors are presented for illustrative purposes only. A motion detector in accordance with the illustrative embodiments may include any type of known or available motion detector and is not limited to the motion detectors described herein.

A pressure sensor detector may be, for example, a device for detecting a change in weight or mass associated with the pressure sensor. For example, if one or more pressure sensors are imbedded in a sidewalk, Astroturf, or floor mat, the pressure sensor detects a change in weight or mass when a human customer or animal steps on the pressure sensor. The pressure sensor may also detect when a human customer or animal steps off of the pressure sensor. In another example, one or more pressure sensors are embedded in a parking lot, and the pressure sensors detect a weight and/or mass associated with a vehicle when the vehicle is in contact with the pressure sensor. A vehicle may be in contact with one or more pressure sensors when the vehicle is driving over one or more pressure sensors and/or when a vehicle is parked on top of one or more pressure sensors.

In this example, detectors 204-210 are located at locations along an outer perimeter of digital customer marketing environment 200. However, detectors 204-210 may be located at any position outside retail facility 202 to detect customers before the customers enter retail facility 202 and/or when customers exit retail facility 202.

Detectors 204-210 are connected to an analysis server on a data processing system, such as network data processing system 100 in FIG. 1. The analysis server is illustrated and described in greater detail in FIG. 6 below. The analysis server includes software for analyzing digital images and other data captured by detectors 204-210 to track and/or visually identify retail items, containers, and/or customers outside retail facility 202. Attachment of identifying marks may be part of this visual identification in the illustrative embodiments.

In this example, four detectors, detectors 204-210, are located outside retail facility 202. However, any number of detectors may be used to detect, track, and/or gather dynamic data associated with customers outside retail facility 202. For example, a single detector, as well as two or more detectors may be used outside retail facility 202 for tracking customers entering and/or exiting retail facility 202. The dynamic customer data gathered by the one or more detectors in detectors 204-210 is referred to herein as external data.

Camera 212 is an image capture device that may be implemented as any type of known or available camera, including, but not limited to, a video camera for taking moving video images, a digital camera capable of taking still pictures and/or a continuous video stream, a stereo camera, a web camera, and/or any other imaging device capable of capturing a view of whatever appears within the camera's range for remote monitoring, viewing, or recording of a distant or obscured person, object, or area.

Various lenses, filters, and other optical devices such as zoom lenses, wide angle lenses, mirrors, prisms and the like may also be used with camera 212 to assist in capturing the desired view. Camera 212 may be fixed in a particular orientation and configuration, or it may, along with any optical devices, be programmable in orientation, light sensitivity level, focus or other parameters. Programming data may be provided via a computing device, such as server 104 in FIG. 1.

Camera 212 may also be a stationary camera and/or non-stationary camera. A non-stationary camera is a camera that is capable of moving and/or rotating along one or more directions, such as up, down, left, right, and/or rotate about an axis of rotation. Camera 212 may also be capable of moving to follow or track a person, animal, or object in motion. In other words, the camera may be capable of moving about an axis of rotation in order to keep a customer, animal, or object within a viewing range of the camera lens. In this example, detectors 204-210 are non-stationary digital video cameras. Camera 212 may be coupled to and/or in communication with the analysis server. In addition, more than one image capture device may be operated simultaneously without departing from the illustrative embodiments of the present invention.

Retail facility 202 may also optionally include set of detectors 213 inside retail facility 202. Set of detectors 213 is a set of one or more detectors, such as detectors 204-210. Set of detectors 213 are detectors for gathering dynamic data inside retail facility 202. The dynamic data gathered by set of detectors 213 includes, without limitation, grouping data, identification data, and/or customer behavior data. The dynamic data associated with a customer that is captured by one or more detectors in set of detectors 213 is referred to herein as internal data.

Set of detectors 213 may be located at any location within retail facility 202. In addition, set of detectors 213 may include multiple detectors located at differing locations within retail facility 202. For example, a detector in set of detectors 213 may be located, without limitation, at an entrance to retail facility 202, on one or more shelves in retail facility 202, and/or on one or more doors or doorways in retail facility 202. In one embodiment, set of detectors 213 includes one or more cameras or other image capture devices for tracking and/or identifying items, containers for items, shopping containers, customers, shopping companions of the customer, shopping carts, and/or store employees inside retail facility 202.

Display devices 214 are multimedia devices for displaying marketing messages to customers. Display devices 214 may be any type of display device for presenting a text, graphic, audio, video, and/or any combination of text, graphics, audio, and video to a customer. In this example, display devices 214 are located inside retail facility 202. Display devices 214 may be one or more display devices located within retail facility 202 for use and/or viewing by one or more customers. The images shown on display devices 214 are changed in real time in response to various events such as, without limitation, the time of day, the day of the week, a particular customer approaching the shelves or rack, items already placed inside container 220 by the customer, and dynamic data for the customer.

Display devices 216 located outside retail facility 216 include at least one display device. The display device(s) may be, without limitation, a display screen or a kiosk located in a parking lot, queue line, and/or other area outside of retail facility 202. Display devices 216 outside retail facility 202 may be used in the absence of display devices 214 inside retail facility 202 or in addition to display devices 214.

Display device 226 may be operatively connected to a data processing system via wireless, infrared, radio, or other connection technologies known in the art, for the purpose of transferring data to be displayed on display device 226. The data processing system includes the analysis server for analyzing dynamic external customer data obtained from detectors 204-210 and set of detectors 213, as well as static customer data obtained from one or more databases storing data associated with customers.

Biometric devices 218 are one or more biometric devices for gathering biometric data associated with one or more customers. Biometric devices 218 include, without limitation, a fingerprint scanner, a retinal scanner, a voice analysis device, a device for measuring heart rate, respiration, blood pressure, body temperature, or a device for capturing any other biometric reading associated with a customer.

Container 220 is a container for holding, carrying, transporting, or moving one or more items. For example, container 220 may be, without limitation, a shopping cart, a shopping bag, a shopping basket, and/or any other type of container for holding items. In this example, container 220 is a shopping cart. In this example in FIG. 2, only one container 220 is depicted. However, any number of containers may be used inside and/or outside retail facility 202 for holding, carrying, transporting, or moving items selected by customers.

Container 220 may also optionally include identification tag 224. Identification tag 224 is a tag for identifying container 220, locating container 220 within digital customer marketing environment 200, either inside or outside retail facility 202, and/or associating container 220 with a particular customer. For example, identification tag 224 may be a radio frequency identification (RFID) tag, a universal product code (UPC) tag, a global positioning system (GPS) tag, and/or any other type of identification tag for identifying, locating, and/or tracking a container.

Container 220 may also include display device 226 coupled to, mounted on, attached to, or imbedded within container 220. Display device 226 is a multimedia display device for displaying textual, graphical, video, and/or audio marketing messages to a customer. For example, display device 226 may be a digital display screen or personal digital assistant attached to a handle, front, back, or side member of container 220.

Container 220 may optionally include an identification tag reader (not shown) for receiving data from identification tags 230 associated with retail items 228. Retail items 228 are items of merchandise for sale. Retail items 228 may be displayed on a display shelf (not shown) located in retail facility 202. Other items of merchandise may be for sale, such as, without limitation, food, beverages, shoes, clothing, household goods, decorative items, or sporting goods, may be hung from display racks, displayed in cabinets, on shelves, or in refrigeration units (not shown). Any other type of merchandise display arrangement known in the retail trade may also be used in accordance with the illustrative embodiments. For example, display shelves or racks may include, in addition to retail items 228, various advertising displays, images, or postings.

Retail items 228 may be viewed or identified by the illustrative embodiments using an image capture device or other detector in set of detectors 213. To facilitate identification, items may have attached identification tags 230. Identification tags 230 are tags associated with one or more retail items for identifying the item and/or location of the item. For example, identification tags 230 may be, without limitation, a bar code pattern, such as a universal product code (UPC) or European article number (EAN), a radio frequency identification (RFID) tag, or other optical identification tag, depending on the capabilities of the image capture device and associated data processing system to process the information and make an identification of retail items 228. In some embodiments, an optical identification may be attached to more than one side of a given item.

Biometric device 222 is a device coupled or mounted to container 220 for gathering biometric readings associated with the customer using container 220.

The data processing system, discussed in greater detail in FIG. 3 below, includes associated memory which may be an integral part, such as the operating memory, of the data processing system or externally accessible memory. Software for tracking objects may reside in the memory and run on the processor. The software is capable of tracking retail items 228, as a customer removes an item in retail items 228 from its display position and places the item into container 220. Likewise, the tracking software can track items which are being removed from container 220 and placed elsewhere in the retail store, whether placed back in their original display position or anywhere else including into another container. The tracking software can also track the position of container 220 and the customer.

The software can track retail items 228 by using data from one or more of detectors 204-210 located externally to retail facility, internal data captured by one or more detectors in set of detectors 213 located internally to retail facility 202, such as identification data received from identification tags 230 and/or identification data received from identification tag 224.

The software in the data processing system keeps a list of which items have been placed in each shopping container, such as container 220. The list is stored in a database, such as, without limitation, a spreadsheet, relational database, hierarchical database or the like. The database may be stored in the operating memory of the data processing system, externally on a secondary data storage device, locally on a recordable medium such as a hard drive, floppy drive, CD ROM, DVD device, remotely on a storage area network, such as storage area network 108 in FIG. 1, or in any other type of storage device.

The lists of items in container 220 are updated frequently enough to maintain a dynamic, accurate, real time listing of the contents of each container as customers add and remove items from containers, such as container 220. The listings of items in containers are also made available to whatever inventory system is used in retail facility 202. Such listings represent an up-to-the-minute view of which items are still available for sale, for example, to on-line shopping customers or customers physically located at retail facility 202. The listings may also provide a demand side trigger back to the supplier of each item. In other words, the listing of items in customer shopping containers can be used to update inventories, determine current stock available for sale to customers, and/or identification of items that need to be restocked or replenished.

At any time, the customer using container 220 may request to see a listing of the contents of container 220 by entering a query at a user interface to the data processing system. The user interface may be available at a kiosk, computer, personal digital assistant, or other computing device connected to the data processing system via a network connection. The user interface may also be coupled to a display device, such as, at a display device in display devices 214, display devices 216, or display device 226 associated with container 220. The customer may also make such a query after leaving the retail store. For example, a query may be made using a portable device or a home computer workstation.

The listing is then displayed at a location where it may be viewed by the customer on a display device. The listing may include the quantity of each item in container 220, as well as the brand, price of each item, discount or amount saved off the regular price of each item, and a total price for all items in container 220. Other data may also be displayed as part of the listing, such as, additional incentives to purchase one or more other items.

When the customer is finished shopping, the customer may proceed to a point-of-sale checkout station. The checkout station may be coupled to the data processing system, in which case, the items in container 220 are already known to the data processing system due to the dynamic listing of items in container 220 that is maintained as the customer shops in digital customer marketing environment 200. Thus, there is no need for an employee, customer, or other person to scan each item in container 220 to complete the purchase of each item, as is commonly done today. In this example, the customer merely arranges for payment of the total, for example by use of a smart card, credit card, debit card, cash, or other payment method. In some embodiments, it may not be necessary to empty container 220 at the retail facility at all if container 220 is a minimal cost item which can be kept by the customer.

In other embodiments, container 220 belongs to the customer. The customer brings container 220 to retail facility 202 at the start of the shopping session. In another embodiment, container 220 belongs to retail facility 202 and must be returned before the customer leaves digital customer marketing environment 200.

In another example, when the customer is finished shopping, the customer may complete checkout either in-aisle or from a final or terminal-based checkout position in the store using a transactional device which may be integral with container 220 or associated temporarily to container 220. The customer may also complete the transaction using a consumer owned computing device, such as a laptop, cellular telephone, or personal digital assistant that is connected to the data processing system via a network connection.

The customer may also make payment by swiping a magnetic strip on a card, using any known or available radio frequency identification (RFID) enabled payment device, or using a biometric device for identifying the customer by the customer's fingerprint, voiceprint, thumbprint, and/or retinal pattern. In such as case, the customer's account is automatically charged after the customer is identified.

The transactional device may also be a portable device such as a laptop computer, palm device, or any other portable device specially configured for such in-aisle checkout service, whether integral with container 220 or separately operable. In this example, the transactional device connects to the data processing system via a network connection to complete the purchase transaction at check out time.

Checkout may be performed in-aisle or at the end of the shopping trip whether from any point or from a specified point of transaction. As noted above, checkout transactional devices may be stationary shared devices or portable or mobile devices offered to the customer from the store or may be devices brought to the store by the customer, which are compatible with the data processing system and software residing on the data processing system.

Set of speakers 232 is a set of one or more speakers in a sound system. Set of speakers are used to create an ambiance in retail facility 202 by performing acts such as, without limitation, playing subliminal messages over a sound system, wherein the subliminal messages encourage the undesirable customer to leave the retail facility, playing music over a sound system to encourage the undesirable customer to leave, playing music designed to soothe or relax a customer, or other actions.

Set of lights 234 is a set of one or more lights in retail facility 202. Set of lights 234 are used to create an ambiance by performing actions such as, but not limited to, shining bright lights in an area of the retail facility occupied by the undesirable customer, shining red lights, flashing lights, softening a lighting level to create a more relaxed or soothing atmosphere, or other actions.

Thus, in this depicted example, when a customer enters digital customer marketing environment but before the customer enters retail facility 202, such as a retail store, the customer is detected and identified by one or more detectors in detectors 204-210 to generate external data. The customer identification may be an exact identification of the customer by name, identification by an identifier, or an anonymous identification that is used to track the customer even though the customer's exact name and identity is not known. If the customer takes a shopping container before entering retail facility 202, the shopping container is also identified. In some embodiments, the customer may be identified through identification of container 220.

An analysis server in a data processing system associated with retail facility 202 begins performing data mining on available static customer data, such as, but not limited to, customer profile information and demographic information, for use in generating customized marketing messages targeted to the customer. In one embodiment, the customer is presented with customized digital marketing messages on one or more display devices in display devices 216 located externally to retail facility 202 before the customer enters retail facility 202.

The customer is tracked using image data and/or other detection data captured by detectors 204-210 as the customer enters retail facility 202. The customer is identified and tracked inside retail facility 202 by one or more detectors inside the facility, such as set of detectors 213.

When the customer enters retail facility 202, the customer is typically offered, provided, or permitted to take shopping container 220 for use during shopping.

When the customer takes a shopping container, such as container 220, the analysis server uses data from set of detectors 213, such as, identification data from identification tags 230 and 224, to track container 220 and items selected by the customer and placed in container 220.

As a result, an item selected by the customer, for example, as the customer removes the item from its stationary position on a store display, is identified. The selected item may be traced visually by a camera, tracked by another type of detector in set of detectors 213 and/or using identification data from identification tags 230. The item is tracked until the customer places it in container 220 to form a selected item.

Thus, a selected item is identified when a customer removes an item from a store display, such as a shelf, display counter, basket, or hanger. In another embodiment, the selected item is identified when the customer places the item in the customer's shopping basket, shopping bag, or shopping cart.

Container 220 may contain a digital media display, such as display device 226, mounted on container 220 and/or customer may be offered a handheld digital media display device, such as a display device in display devices 214. In the alternative, the customer may be encouraged to use strategically placed kiosks running digital media marketing messages throughout retail facility 202. Display device 226, 214, and/or 216 may include a verification device for verifying an identity of the customer.

For example, display device 214 may include a radio frequency identification tag reader 232 for reading a radio frequency identification tag, a smart card reader for reading a smart card, or a card reader for reading a specialized store loyalty or frequent customer card. Once the customer has been verified, the data processing system retrieves past purchase history, total potential wallet-share, shopper segmentation information, customer profile data, granular demographic data for the customer, and/or any other available customer data elements using known or available data retrieval and/or data mining techniques. These customer data elements are analyzed using at least one data model to determine appropriate digital media content to be pushed, on-demand, throughout the store to customers viewing display devices 214, 216, and/or display device 226.

The customer is provided with incentives to use display devices 214, 216, and/or display device 226 to obtain marketing incentives, promotional offers, and discounts for items. When the customer has finished shopping, the customer may be provided with a list of savings or "tiered" accounting of savings over the regular price of purchased items if a display device had not been used to view and use customized digital marketing messages.

In this example, a single container and a single customer is described. However, the aspects of the illustrative embodiments may also be used to track multiple containers and multiple customers simultaneously. In this case, the analysis server will store a separate listing of selected items for each active customer. As noted above, the listings may be stored in a database. The listing of items in a given container is displayed to a customer, employee, agent, or other customer in response to a query. The listing may be displayed to a customer at any time, either while actively shopping, during check-out, or after the customer leaves retail facility 202.

This process provides an intelligent guided selling methodology to optimize customer throughput in the store, thereby maximizing or optimizing total retail content and/or retail sales, profit, and/or revenue for retail facility 202. It will be appreciated by one skilled in the art that the words "optimize", "optimization" and related terms are terms of art that refer to improvements in speed and/or efficiency of a computer program, and do not purport to indicate that a computer program has achieved, or is capable of achieving, an "optimal" or perfectly speedy/perfectly efficient state.

Next, FIG. 3 is a block diagram of a data processing system in which illustrative embodiments may be implemented. Data processing system 300 is an example of a computer, such as server 104 or client 110 in FIG. 1, in which computer usable code or instructions implementing the processes may be located for the illustrative embodiments. In this example, data is transmitted from data processing system 300 to the retail facility over a network, such as network 102 in FIG. 1. In another embodiment, data processing system 300 is located on-site at the retail facility.

In the depicted example, data processing system 300 employs a hub architecture including a north bridge and memory controller hub (MCH) 302 and a south bridge and input/output (I/O) controller hub (ICH) 304. Processing unit 306, main memory 308, and graphics processor 310 are coupled to north bridge and memory controller hub 302. Processing unit 306 may contain one or more processors and even may be implemented using one or more heterogeneous processor systems. Graphics processor 310 may be coupled to the MCH through an accelerated graphics port (AGP), for example.

In the depicted example, local area network (LAN) adapter 312 is coupled to south bridge and I/O controller hub 304 and audio adapter 316, keyboard and mouse adapter 320, modem 322, read only memory (ROM) 324, universal serial bus (USB) ports and other communications ports 332, and PCI/PCIe devices 334 are coupled to south bridge and I/O controller hub 304 through bus 338, and hard disk drive (HDD) 326 and CD-ROM drive 330 are coupled to south bridge and I/O controller hub 304 through bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be coupled to south bridge and I/O controller hub 304.

An operating system runs on processing unit 306 and coordinates and provides control of various components within data processing system 300 in FIG. 3. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 300. Java and all Java-based trademarks are trademarks of Sun Microsystems, Inc. in the United States, other countries, or both.

Instructions for the operating system, the object-oriented programming system, and applications or programs are located on storage devices, such as hard disk drive 326, and may be loaded into main memory 308 for execution by processing unit 306. The processes of the illustrative embodiments may be performed by processing unit 306 using computer implemented instructions, which may be located in a memory such as, for example, main memory 308, read only memory 324, or in one or more peripheral devices.

In some illustrative examples, data processing system 300 may be a personal digital assistant (PDA), which is generally configured with flash memory to provide non-volatile memory for storing operating system files and/or customer-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 308 or a cache such as found in north bridge and memory controller hub 302. A processing unit may include one or more processors or CPUs.

Figure 4:
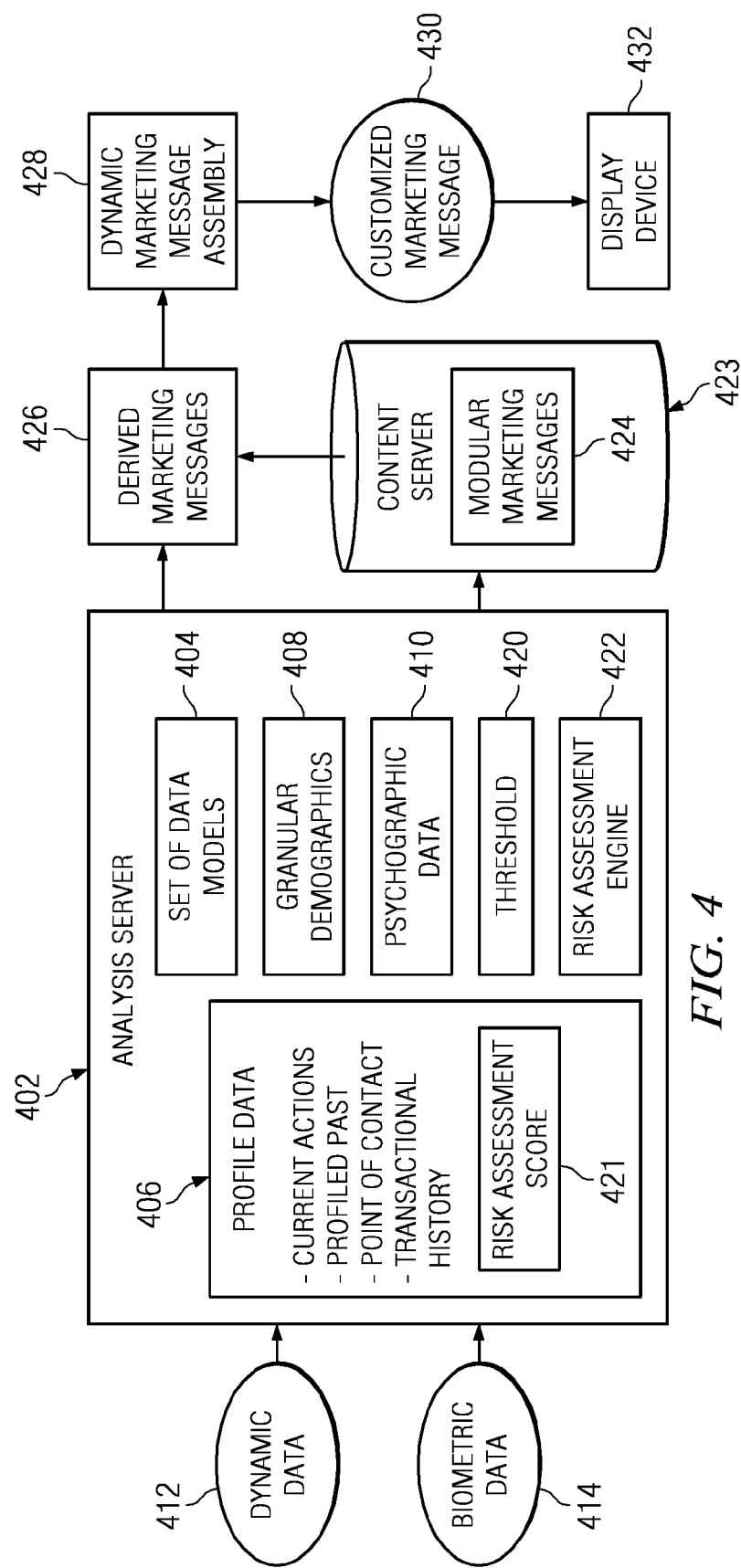
FIG. 4 is a block diagram of a data processing system for analyzing dynamic customer data in accordance with an illustrative embodiment.

Referring now to FIG. 4, a block diagram of a data processing system for analyzing dynamic data to generate customized marketing messages is shown in accordance with an illustrative embodiment. Data processing system 400 is a data processing system, such as data processing system 100 in FIG. 1 and/or data processing system 300 in FIG. 3.

Analysis server 402 is any type of known or available server for analyzing dynamic customer data elements for use in generating customized digital marketing messages. Analysis server 402 may be a server, such as server 104 in FIG. 1 or data processing system 300 in FIG. 3. Analysis server 402 includes set of data models 404 for analyzing dynamic customer data elements and static customer data elements.

Set of data models 404 is one or more data models created a priori or pre-generated for use in analyzing customer data objects for personalizing content of marketing messages presented to the customer. Set of data models 404 includes one or more data models for identifying customer data objects and determining relationships between the customer data objects. The data models in set of data models 404 are generated using at least one of a statistical method, a data mining method, a causal model, a mathematical model, a marketing model, a behavioral model, a psychological model, a sociological model, or a simulation model.

Profile data 406 is data regarding one or more customers. In this example, profile data 406 includes point of contact data, profiled past data, current actions data, transactional history data, certain click-stream data, granular demographics 408, psychographic data 410, registration e.g. customer provided data, and account data and/or any other data regarding a customer.

Point of contact data is data regarding a method or device used by a customer to interact with a data processing system of a merchant or supplier and/or receive customized marketing message 430 for display. The customer may interact with the merchant or supplier using a computing device or display terminal having a user interface for inputting data and/or receiving output. The device or terminal may be a device provided by the retail facility and/or a device belonging to or provided by the customer. For example, the display or access device may include, but is not limited to, a cellular telephone, a laptop computer, a desktop computer, a computer terminal kiosk, or personal digital assistant (PDA).

If display device 432 is a display device associated with the retail facility, details and information regarding display device 432 will be known to analysis server 402. However, if display device 432 is a display device belonging to the customer or brought to the retail facility by the customer, analysis server 402 may identify the type of display device using techniques such as interrogation commands, cookies, or any other known or equivalent technique. From the type of device other constraints may be determined such as display size, resolution, refresh rate, color capability, keyboard entry capability, other entry capability such as pointer or mouse, speech recognition and response, language constraints, and any other fingertip touch point constraints and assumptions about customer state of the display device. For example, someone using a cellular phone may have a limited time window for making phone calls and be sensitive to location and local time of day, whereas a casual home browser may have a greater luxury of time and faster connectivity.

An indication of a location for the point of contact may also be determined. For example, global positioning system (GPS) coordinates of the customer may be determined if the customer device has such a capability whether by including a real time global positioning system receiver or by periodically storing global positioning system coordinates entered by some other method. Other location indications may also be determined such as post office address, street or crossroad coordinates, latitude-longitude coordinates or any other location indicating system.

Analysis server 402 may also determine the connectivity associated with the customer's point of contact. For example, the customer may be connected to the merchant or supplier in any of a number ways such as a modem, digital modem, network, wireless network, Ethernet, intranet, or high speed lines including fiber optic lines. Each way of connection imposes constraints of speed, latency, and/or mobility which can then also be determined.

The profiled past comprises data that may be used, in whole or in part, for individualization of customized marketing message 430. Global profile data may be retrieved from a file, database, data warehouse, or any other data storage device. Multiple storage devices and software may also be used to store profile data 406. Some or all of the data may be retrieved from the point of contact device, as well. The profiled past may comprise an imposed profile, global profile, individual profile, and demographic profile. The profiles may be combined or layered to define the customer for specific promotions and marketing offers.

In the illustrative embodiments, a global profile includes data on the customer's interests, preferences, and affiliations. The profiled past may also comprise retrieving purchased data. Various firms provide data for purchase which is grouped or keyed to presenting a lifestyle or life stage view of customers by block or group or some other baseline parameter. The purchased data presents a view of one or more customers based on aggregation of data points such as, but not limited to geographic block, age of head of household, income level, number of children, education level, ethnicity, and purchasing patterns.

The profiled past may also include navigational data relating to the path the customer used to arrive at a web page which indicates where the customer came from or the path the customer followed to link to the merchant or supplier's web page. Transactional data of actions taken is data regarding a transaction. For example, transaction data may include data regarding whether the transaction is a first time transaction or a repeat transaction, and/or how much the customer usually spends. Information on how much a customer generally spends during a given transaction may be referred to as basket share. Data voluntarily submitted by the customer in responding to questions or a survey may also be included in the profiled past.

Current actions, also called a current and historical record, are also included in profile data 406. Current actions are data defining customer behavior. One source of current actions is listings of the purchases made by the customer, payments and returns made by the customer, and/or click-stream data from a point of contact device of the customer. Click-stream data is data regarding a customer's navigation of an online web page of the merchant or supplier. Click-stream data may include page hits, sequence of hits, duration of page views, response to advertisements, transactions made, and conversion rates. Conversion rate is the number of times the customer takes action divided by the number of times an opportunity is presented.

In this example, profiled past data for a given customer is stored in analysis server 402. However, in accordance with the illustrative embodiments, profiled past data may also be stored in any local or remote data storage device, including, but not limited to, a device such as storage area network 108 in FIG. 1 or read only memory (ROM) 324 and/or compact disk read only memory (CD-ROM) 330 in FIG. 3.

Granular demographics 408 is a source of static customer data elements. Static customer data elements are data elements that do not tend to change in real time, such as a customer's name, date of birth, and address. Granular demographics 408 provides a detailed demographics profile for one or more customers. Granular demographics 408 may include, without limitation, ethnicity, block group, lifestyle, life stage, income, and education data. Granular demographics 408 may be used as an additional layer of profile data 406 associated with a customer.

Psychographic data 410 refers to an attitude profile of the customer. Examples of attitude profiles include, without limitation, a trend buyer, a time-strapped person who prefers to purchase a complete outfit, a cost-conscious shopper, a customer that prefers to buy in bulk, or a professional buyer who prefers to mix and match individual items from various suppliers.

Dynamic data 412 is data that includes dynamic customer data elements that are changing in real-time. For example, dynamic customer data elements could include, without limitation, the current contents of a customer's shopping basket, the time of day, the day of the week, whether it is the customer's birthday or other holiday observed by the customer, customer's responses to marketing messages and/or items viewed by the customer, customer location, the customer's current shopping companions, the speed or pace at which the customer is walking through the retail facility, and/or any other dynamically changing customer information. Dynamic data 412 includes external data, grouping data, customer identification data, customer behavior data, and/or current events data.

Dynamic data 412 is processed and/or analyzed to generate customized marketing messages. Processing dynamic data 412 includes, but is not limited to, filtering dynamic data 412 for relevant data elements, combining dynamic data 412 with other dynamic customer data elements, comparing dynamic data 412 to baseline or comparison models for external data, and/or formatting dynamic data 412 for utilization and/or analysis in one or more data models in set of data models 404. The processed dynamic data 412 is analyzed and/or further processed using one or more data models in set of data models 404.

Dynamic data 412 may include customer identification data. Customer identification data identifies the customer without human input. In this case, the customer identification data may be generated by performing, without limitation, facial recognition analysis on an image of a face of the customer, license plate recognition analysis on an image of a vehicle license plate, a fingerprint analysis on a fingerprint of the customer, and voice analysis on a sound file. A customer profile can then be retrieved from profile data 406 using the customer identification data in dynamic data 412.

Biometric data 414 is captured by a set of one or more biometric devices associated with a customer. Biometric devices include, without limitation, a fingerprint scanner, a retinal scanner, a voice analysis device, a device for measuring heart rate, respiration, blood pressure, body temperature, or a device for capturing any other biometric reading associated with a customer. The biometric data is gathered in real-time as the customer is shopping at the retail facility. Biometric data 414 is received by analysis server 402 from the set of biometric devices. The biometric data is data describing a set of physiological responses of the customer.

Biometric readings associated with the customer that are captured by the biometric device(s) are analyzed by analysis server 402 to identify biometric readings that exceed a threshold change to form biometric data 414. If the customer was viewing an item or a marketing message when the change in the biometric reading occurred, analysis server 402 associates the change in the biometric reading with the item or the marketing message to form biometric data 414. If the customer was interacting with another customer, an employee of the retail facility, a child, or an animal, analysis server 402 associates the change in the biometric reading with the another customer, the employee, the child, or the animal to form biometric data 414.

Threshold 420 is a threshold risk assessment score that is used to determine when risk assessment score 421 indicates a customer poses a potential threat to the store. The potential threat posed by the customer to the retail facility includes, but is not limited to, a risk of the customer shoplifting, stealing from other customers or employees, committing theft from the store or other customers, committing violence on employees, other customers, or self-inflicted violence, failing to pay bills, defaulting on loans, disrupting operations of the retail facility, criminal activities, threatening customers, panhandling, and loitering.

Risk assessment engine 422 is software for performing a risk assessment analysis of a customer. In this example, analysis server 402 parses dynamic data 412 associated with a customer to identify patterns of events. Dynamic data 412 includes metadata describing an appearance and behavior of the customer. Risk assessment engine 422 analyzes the patterns of events to identify risk assessment factors for the customer. Risk assessment engine 422 performs a risk assessment analysis using the risk assessment factors for the customer to generate risk assessment score 421 for the customer. Risk assessment score 421 is a ranking that indicates a potential risk posed by the customer to the retail facility. A different risk assessment score is generated for each customer.

Risk assessment engine 422 also retrieves a customer profile for the customer. The customer profile includes static customer data elements describing the customer, such as, but not limited to, the customer's criminal record, credit rating, past incidents in the retail store, and other details regarding the customer's past actions and record. Risk assessment engine 422 analyzes dynamic data 412 and biometric data 414, with the customer profile data to identify the risk assessment factors for the customer.

In another embodiment, risk assessment engine 422 analyzes the risk assessment factors using at least one of a statistical method, a data mining method, and pre-generated manual input to generate weighted risk factors. Risk assessment engine 422 generates risk assessment score 421 using the weighted risk assessment factors and cohort data for the customer. Cohort data is data describing the customer, such as the customer's appearance and behavior. The cohort data may describe the customer as wearing a trench coat in warm weather or wearing sunglasses indoors.

If dynamic data 412 includes grouping data that indicates the customer is shopping with one or more other people or animals, risk assessment score 421 is generated for each member of the group. Grouping data for the customer describes a group associated with the customer. The group may be, for example, a group of parents with children, teenagers, children, minors unaccompanied by adults, minors accompanied by adults, grandparents with grandchildren, senior citizens, couples, friends, coworkers, a customer shopping with a pet, a customer with a large dog, a customer with an unrestrained animal, and a customer shopping alone.

If risk assessment score 421 for the customer is greater than threshold 420, risk assessment engine 422 identifies the customer as an undesirable customer that may pose a potential threat to the store. In response, risk assessment engine 422 initiates aggressive marketing disincentives targeted towards to the undesirable customer. Aggressive marketing disincentives are marketing initiatives intended to decrease an amount of time the customer spends shopping in the retail facility. The aggressive disincentives include, without limitation, informing a set of employees associated with the retail facility that the customer is an undesirable customer and directing the set of employees to avoid offering assistance unless assistance is requested by the customer, providing disincentive marketing messages to the customer that include uncompetitive product pricing and undesirable product offers, and creating a negative ambiance in an area of the retail facility associated with the customer. Creating a negative ambiance further comprises shining harsh or bright lights in an area of the retail facility occupied by the customer, playing subliminal messages over a sound system that encourage or prompt the customer to leave the retail facility, playing music over a sound system, wherein the music is designed to encourage the customer to feel uncomfortable, and/or adjusting a temperature in an area of the retail facility to an uncomfortable temperature, wherein an uncomfortable temperature is at least one of a temperature that is colder than a predetermined temperature, higher than a predetermined comfortable temperature, and a humidity that is higher than a predetermined comfortable humidity level.

If risk assessment score 421 indicates the customer is a highly desirable customer, risk assessment engine initiates marketing incentives targeted towards the customer. The marketing incentives include, without limitation, notifying an employee associated with the retail facility to assist the customer and generating customized marketing messages for the customer that include competitive product pricing and preferred product offers. A display device may also be provided to the customer that provides a map and/or locations of items in the retail facility to improve a shopping experience of the customer.

If risk assessment score 421 indicates the customer is a neutral or moderately desirable customer, risk assessment engine 422 initiates moderate marketing efforts directed towards the customer that are cheaper to generate and present to the customer than aggressive marketing incentives.

Content server 423 is any type of known or available server for storing modular marketing messages 424. Content server 423 may be a server, such as server 104 in FIG. 1 or data processing system 300 in FIG. 3.

Modular marketing messages 424 are two or more self contained marketing messages that may be combined with one or more other modular marketing messages in modular marketing messages 424 to form a customized marketing message for display to the customer. Modular marketing messages 424 can be quickly and dynamically assembled and disseminated to the customer in real-time.

In this illustrative example, modular marketing messages 424 are pre-generated. In other words, modular marketing messages 424 are preexisting marketing message units that are created prior to analyzing dynamic data 412 associated with a customer using one or more data models to generate a personalized marketing message for the customer. Two or more modular marketing messages are combined to dynamically generate customized marketing message 430, customized or personalized for a particular customer. Although modular marketing messages 424 are pre-generated, modular marketing messages 424 may also include templates imbedded within modular marketing messages for adding personalized information, such as a customer's name or address, to the customized marketing message.

Derived marketing messages 426 is a software component for determining which modular marketing messages in modular marketing messages 424 should be combined or utilized to dynamically generate customized marketing message 430 for the customer in real time. Derived marketing messages 426 uses the output generated by analysis server 402 as a result of analyzing dynamic data 412 associated with a customer using one or more appropriate data models in set of data models 404 to identify one or more modular marketing messages for the customer. The output generated by analysis server 402 from analyzing dynamic data 412 using appropriate data models in set of data models 404 includes marketing message criteria for the customer.

In other words, dynamic data 412 is analyzed to generate personal marketing message criteria. Derived marketing messages 426 uses the marketing message criteria for the customer to select one or more modular marketing messages in modular marketing messages 424.

A customized marketing message is generated using personalized marketing message criteria that are identified using the dynamic data. Personalized marketing message criteria are criterion or indicators for selecting one or more modular marketing messages for inclusion in the customized marketing message. The personalized marketing message criteria may include one or more criterion. The personalized marketing message criteria may be generated, in part, a priori or pre-generated and in part dynamically in real-time based on the dynamic data for the customer and/or any available static customer data associated with the customer. Dynamic data 412 includes external data gathered outside the retail facility and/or dynamic data gathered inside the retail facility.

If an analysis of dynamic data 412 indicates that the customer is shopping with a large dog, the personal marketing message criteria may include criteria to indicate marketing of pet food and items for large dogs. Because people with large dogs often have large yards, the personal marketing message criteria may also indicate that yard items, such as yard fertilizer, weed killer, or insect repellant may should be marketed. The personal marketing message criteria may also indicate marketing elements designed to appeal to animal lovers and pet owners, such as incorporating images of puppies, images of dogs, phrases such as "man's best friend", "puppy love", advice on pet care and dog health, and/or other pet friendly images, phrases, and elements to appeal to the customer's tastes and interests.

Derived marketing messages 426 uses the output of one or more data models in set of data models 404 that were used to analyze dynamic data 412 associated with a customer to identify one or more modular marketing messages to be combined together to form the personalized marketing message for the customer.

For example, a first modular marketing message may be a special on a more expensive brand of peanut butter. A second modular marketing message may be a discount on jelly when peanut butter is purchased. In response to marketing message criteria that indicates the customer frequently purchases cheaper brands of peanut butter, the customer has children, and the customer is currently in an aisle of the retail facility that includes jars of peanut butter, derived marketing messages 426 will select the first marketing message and the second marketing message based on the marketing message criteria for the customer.

Dynamic marketing message assembly 428 is a software component for combining the one or more modular marketing messages selected by derived marketing messages 426 to form customized marketing message 430. Dynamic marketing message assembly 428 combines modular marketing messages selected by derived marketing messages 426 to create appropriate customized marketing message 430 for the customer. In the example above, after derived marketing messages 426 selects the first modular marketing message and the second modular marketing message based on the marketing message criteria, dynamic marketing message assembly 428 combines the first and second modular marketing messages to generate a customized marketing message offering the customer a discount on both the peanut butter and jelly if the customer purchases the more expensive brand of peanut butter. In this manner, dynamic marketing message assembly 428 provides assembly of customized marketing message 430 based on output from the data models analyzing dynamic data.

Customized marketing message 430 is a unique one-to-one customized marketing message for a specific customer. Customized marketing message 430 is generated using dynamic data 412 and/or static customer data elements, such as the customer's demographics and psychographics, to achieve this unique one-to-one marketing.

Customized marketing message 430 is generated for a particular customer based on dynamic customer data elements, such as grouping data, customer identification data, current events data, and customer behavior data. For example, if modular marketing messages 424 include marketing messages identified by numerals 1-20, customized marketing message 430 may be generated using marketing messages 2, 8, 9, and 19. In this example, modular marketing messages 2, 8, 9, and 19 are combined to create a customized marketing message that is generated for display to the customer rather than displaying the exact same marketing messages to all customers. Customized marketing message 430 is displayed on display device 432.

Customized marketing message 430 may include advertisements, sales, special offers, incentives, opportunities, promotional offers, rebate information and/or rebate offers, discounts, and opportunities. An opportunity may be a "take action" opportunity, such as asking the customer to make an immediate purchase, select a particular item, request a download, provide information, or take any other type of action.

Customized marketing message 430 may also include content or messages pushing advertisements and opportunities to effectively and appropriately drive the point of contact customer to some conclusion or reaction desired by the merchant.

Customized marketing message 430 is formed in a dynamic closed loop manner in which the content delivery depends on dynamic data 412, as well as other dynamic customer data elements and static customer data, such as profile data 406 and granular demographics 408. Therefore, all interchanges with the customer may sense and gather data associated with customer behavior, which is used to generate customized marketing message 430.

Display device 432 is a multimedia display for presenting customized marketing messages to one or more customers. Display device 432 may be a multimedia display, such as, but not limited to, display devices 214, 216, and 226 in FIG. 2. Display device 432 may be, for example, a personal digital assistant (PDA), a cellular telephone with a display screen, an electronic sign, a laptop computer, a tablet PC, a kiosk, a digital media display, a display screen mounted on a shopping container, and/or any other type of device for displaying digital messages to a customer.

Thus, a merchant has a capability for interacting with the customer on a direct one-to-one level by sending customized marketing message 430 to display device 432. Customized marketing message 430 may be sent and displayed to the customer via a network. For example, customized marketing message 430 may be sent via a web site accessed as a unique uniform resource location (URL) address on the World Wide Web, as well as any other networked connectivity or conventional interaction including, but not limited to, a telephone, computer terminal, cell phone or print media.

Display device 432 may be a display device mounted on a shopping cart, a shopping basket, a shelf or compartment in a retail facility, included in a handheld device carried by the customer, or mounted on a wall in the retail facility. In response to displaying customized marketing message 430, a customer can select to print the customized marketing message 430 as a coupon and/or as a paper or hard copy for later use. In another embodiment, display device 432 automatically prints customized marketing message 430 for the customer rather than displaying customized marketing message 430 on a display screen or in addition to displaying customized marketing message 430 on the display screen.

In another embodiment, display device 432 provides an option for a customer to save customized marketing message 430 in an electronic form for later use. For example, the customer may save customized marketing message 430 on a hand held display device, on a flash memory, a customer account in a data base associated with analysis server 402, or any other data storage device. In this example, when customized marketing message 430 is displayed to the customer, the customer is presented with a "use offer now" option and a "save offer for later use" option. If the customer chooses the "save offer" option, the customer may save an electronic copy of customized marketing message 430 and/or print a paper copy of customized marketing message 430 for later use. In this example, customized marketing message 430 is generated and delivered to the customer in response to the customer choosing selected item 420.

Figure 5:
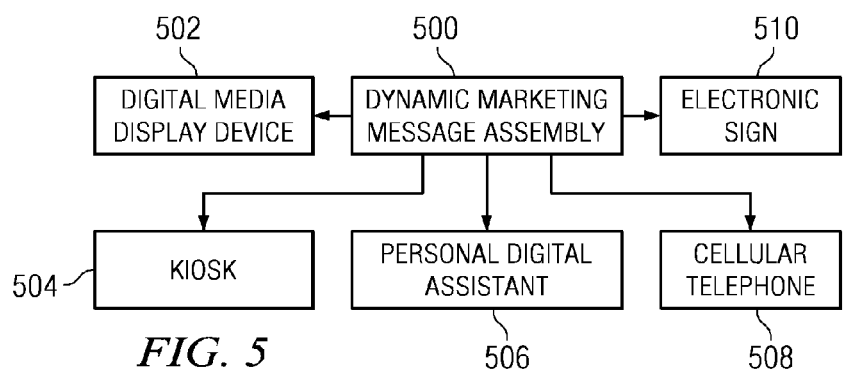
FIG. 5 is a block diagram of a dynamic marketing message assembly transmitting a project based customized marketing message to a set of display devices in accordance with an illustrative embodiment.

FIG. 5 is a block diagram of a dynamic marketing message assembly transmitting a customized marketing message to a set of display devices in accordance with an illustrative embodiment. Dynamic marketing message assembly 500 is a software component for combining two or more modular marketing messages into a customized marketing message for a customer. Dynamic marketing message assembly 500 may be a component such as dynamic marketing message assembly 428 in FIG. 4.

Dynamic marketing message assembly 500 transmits a customized marketing message, such as customized marketing message 430 in FIG. 4, to one or more display devices in a set of display devices. In this example, the set of display devices includes, but is not limited to, digital media display device 502, kiosk 504, personal digital assistant 506, cellular telephone 508, and/or electronic sign 510. A set of display devices in accordance with the illustrative embodiments may include any combination of display devices and any number of each type of display device. For example, a set of display devices may include, without limitation, six kiosks, fifty personal digital assistants, and no cellular telephones. In another example, the set of display devices may include electronic signs and kiosks but no personal digital assistants or cellular telephones.

Digital media display device 502 is any type of known or available digital media display device for displaying a marketing message. Digital media display device 502 may include, but is not limited to, a monitor, a plasma screen, a liquid crystal display screen, and/or any other type of digital media display device.

Kiosk 504 is any type of known or available kiosk. In one embodiment, a kiosk is a structure having one or more open sides, such as a booth. The kiosk includes a computing device associated with a display screen located inside or in association with the structure. The computing device may include a user interface for a user to provide input to the computing device and/or receive output. For example, the user interface may include, but is not limited to, a graphical user interface (GUI), a menu-driven interface, a command line interface, a touch screen, a voice recognition system, an alphanumeric keypad, and/or any other type of interface.

Personal digital assistant 506 is any type of known or available personal digital assistant (PDA). Cellular telephone 508 is any type of known or available cellular telephone and/or wireless mobile telephone. Cellular telephone 508 includes a display screen that is capable of displaying pictures, graphics, and/or text. Additionally, cellular telephone 508 may also include an alphanumeric keypad, joystick, and/or buttons for providing input to cellular telephone 508. The alphanumeric keypad, joystick, and/or buttons may be used to initiate various functions in cellular telephone 508. These functions include for example, activating a menu, displaying a calendar, receiving a call, initiating a call, displaying a customized marketing message, saving a customized marketing message, and/or selecting a saved customized marketing message.

Electronic sign 510 is any type of electronic messaging system. For example, electronic sign 510 may include, without limitation, an outdoor electronic light emitting diode (LED) display, moving message boards, variable message signs, tickers, electronic message centers, video boards, and/or any other type of electronic signage.

The display device may also include, without limitation, a laptop computer, a smart watch, a digital message board, a monitor, a tablet PC, a printer for printing the customized marketing message on a paper medium, or any other output device for presenting output to a customer.

A display device may be located externally to the retail facility to display marketing messages to the customer before the customer enters the retail facility. In another embodiment, the customized marketing message is displayed to the customer on a display device inside the retail facility after the customer enters the retail facility and begins shopping.

Figure 6:
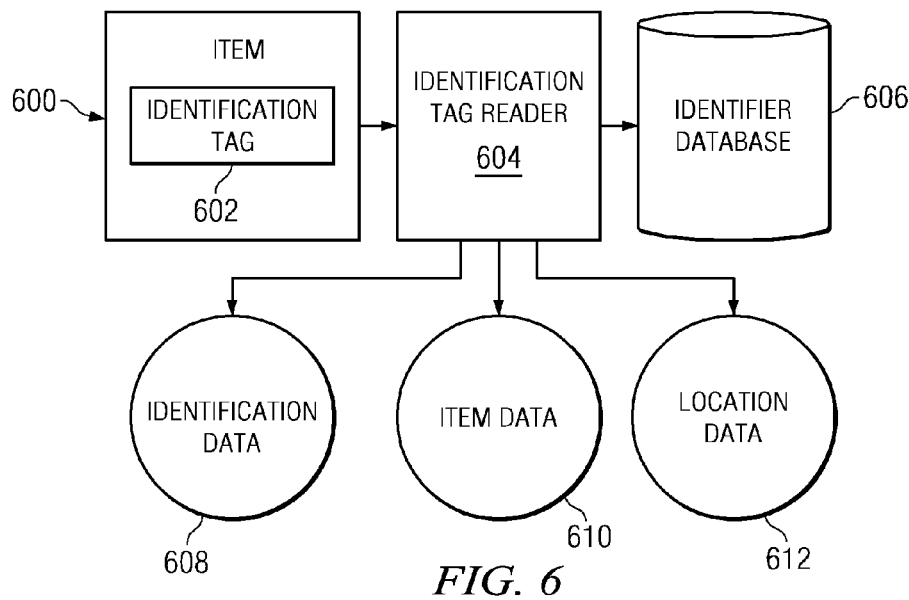
FIG. 6 is a block diagram of an identification tag reader for identifying items selected by a customer in accordance with an illustrative embodiment.

Turning now to FIG. 6, a block diagram of an identification tag reader for identifying items selected by a customer is shown in accordance with an illustrative embodiment. Item 600 is any type of item, such as retail items 228 in FIG. 2. Identification tag 602 associated with item 600 is a tag for providing information regarding item 600 to identification tag reader 604. Identification tag 602 is a tag such as a tag in identification tags 230 in FIG. 2. Identification tag 602 may be a bar code, a radio frequency identification tag, a global positioning system tag, and/or any other type of tag.

Radio Frequency Identification tags include read-only identification tags and read-write identification tags. A read-only identification tag is a tag that generates a signal in response to receiving an interrogate signal from an item identifier. A read-only identification tag does not have a memory. A read-write identification tag is a tag that responds to write signals by writing data to a memory within the identification tag. A read-write tag can respond to interrogate signals by sending a stream of data encoded on a radio frequency carrier. The stream of data can be large enough to carry multiple identification codes. In this example, identification tag 602 is a radio frequency identification tag.

Identification tag reader 604 is any type of known or available device for retrieving information from identification tag 602. Identification tag reader 604 may be, but is not limited to, a radio frequency identification tag reader or a bar code reader, such as identification tag reader 232 in FIG. 2. A bar code reader is a device for reading a bar code, such as a universal product code. In this example, identification tag reader 604 provides identification data 606, item data 610, and/or location data 612 to an analysis server, such as analysis server 402 in FIG. 4.

Identification data 608 is data regarding the product name and/or manufacturer name of item 600 selected for purchase by a customer. Item data 610 is information regarding item 600, such as, without limitation, the regular price, sale price, product weight, and/or tare weight for item 600. Identification data 608 is used to identify items selected by the customer for purchase.

Location data 612 is data regarding a location of item 600 within the retail facility and/or outside the retail facility. For example, if identification tag 602 is a bar code, the item associated with identification tag 602 must be in close physical proximity to identification tag reader 604 for a bar code scanner to read a bar code on item 600. Therefore, location data 612 is data regarding the location of identification tag reader 604 currently reading identification tag 602. However, if identification tag 602 is a global positioning system tag, a substantially exact or precise location of item 600 may be obtained using global positioning system coordinates obtained from the global positioning system tag.

Identifier database 606 is a database for storing any information that may be needed by identification tag reader 604 to read identification tag 602. For example, if identification tag 602 is a radio frequency identification tag, identification tag will provide a machine readable identification code in response to a query from identification tag reader 604. In this case, identifier database 606 stores description pairs that associate the machine readable codes produced by identification tags with human readable descriptors. For example, a description pair for the machine readable identification code "10141014111111" associated with identification tag 602 would be paired with a human readable item description of item 600, such as "orange juice." An item description is a human understandable description of an item. Human understandable descriptions are for example, text, audio, graphic, or other representations suited for display or audible output.

Figure 7:
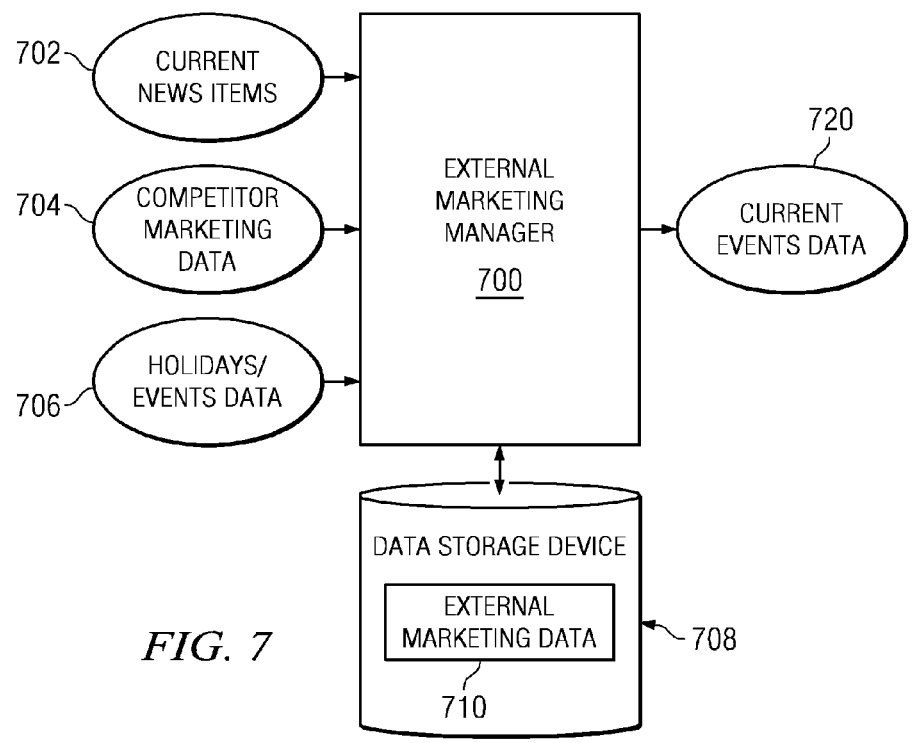
FIG. 7 is a block diagram illustrating an external marketing manager for generating current events data in accordance with an illustrative embodiment.

FIG. 7 is a block diagram illustrating an external marketing manager for generating current events data in accordance with an illustrative embodiment. External marketing manager 700 is a software component for collecting current news items 702, competitor marketing data 704, holidays, seasonal events, seasonal celebrations, and/or events data 706, and/or any other current events or news data from a set of sources. The set of sources may include one or more sources. A source may be, without limitation, a newspaper, catalog, a web page or other network resource, a television program or commercial, a flier, a pamphlet, a book, a booklet, a news board, a coupon board, a news group, a blog, a magazine, a religious calendar, a secular calendar, or any other paper or electronic source of information. A source may also include information provided by a human user.

External marketing manager 700 stores current news items 702, competitor marketing data 704, holidays and/or events data 706, and/or any other current events or news data in data storage device 708 as external marketing data 710. Data storage device 708 may be implemented as any type of data storage device, including, without limitation, a hard disk, a database, a main memory, a flash memory, a random access memory (RAM), a read only memory (ROM), or any other data storage device.

In this example, external marketing manager 700 filters or processes external marketing data 710 to form current events data 720. Filtering external marketing data 710 may include selecting data items or data objects associated with marketing one or more items to a customer. A data item or data object associated with marketing one or more items is a data element that may influence a customer's decision to purchase a product. For example, the occurrence of a sporting event may influence the items purchased by a customer, such as pizza, potato chips, beer, and big screen television sets.

A data element indicating the occurrence of a holiday or religious event, such as Christmas or Thanksgiving, may also influence the items purchased by a customer. For example, as Thanksgiving approaches, customers are more likely to purchase turkey and pumpkin pie. At Easter, customers are more likely to purchase ham, chocolate bunnies, and Easter eggs.

A data element indicating that a storm or hurricane is approaching may influence projects such as installing storm shutters and generators. These data elements that may influence customer purchases and sales of items are selected to form current events data 720. Current events data 720 is then sent to an analysis server, such as analysis server 402 in FIG. 4 for use in identifying items likely to be of interest to customers, as well as personalizing marketing messages to a customer.

In this example, external marketing manager 700 filters external marketing data 710 for relevant data elements to form current events data 720 without intervention by a human user. In another embodiment, a human user filters external marketing data 710 manually to generate current events data 720. The analysis server uses the current events data to identify an event of interest to the customer that occurs within a predetermined period of time. For example, if a customer profile and dynamic data indicates that the customer is Catholic and current events data 720 indicates Mardi Gras is approaching, the analysis server can identify items associated with Mardi Gras, such as King Cake, Mardi Gras beads, and masks.

Figure 8:
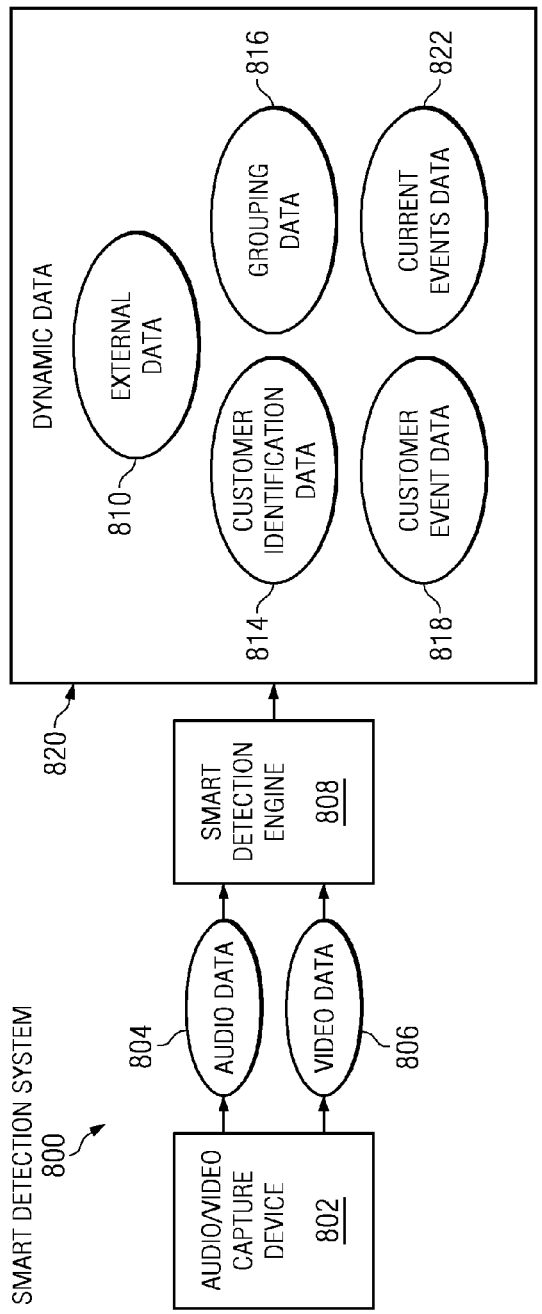
FIG. 8 is a block diagram illustrating a smart detection engine for generating customer identification data and selected item data in accordance with an illustrative embodiment.

FIG. 8 is a block diagram illustrating a smart detection engine for generating customer identification data and selected item data in accordance with an illustrative embodiment. Smart detection system 800 is a software architecture for analyzing camera images and other detection data to form dynamic data 820. In this example, the detection data is video images captured by a camera. However, the detection data may also include, without limitation, pressure sensor data captured by a set of pressure sensors, heat sensor data captured by a set of heat sensors, motion sensor data captured by a set of motion sensors, audio captured by an audio detection device, such as a microphone, or any other type of detection data described herein.

Audio/video capture device 802 is a device for capturing video images and/or capturing audio. Audio/video capture device 802 may be, but is not limited to, a digital video camera, a microphone, a web camera, or any other device for capturing sound and/or video images.

Audio data 804 is data associated with audio captured by audio/video capture device 802, such as human voices, vehicle engine sounds, dog barking, horns, and any other sounds. Audio data 804 may be a sound file, a media file, or any other form of audio data. Audio/video capture device 802 captures audio associated with a set of one or more customers inside a retail facility and/or outside a retail facility to form audio data 804.

Video data 806 is image data captured by audio/video capture device 802. Video data 806 may be a moving video file, a media file, a still picture, a set of still pictures, or any other form of image data. Video data 806 is video or images associated with a set of one or more customers inside a retail facility and/or outside a retail facility.

For example, video data 806 may include images of a customer's face, an image of a part or portion of a customer's car, an image of a license plate on a customer's car, and/or one or more images showing a customer's behavior. An image showing a customer's behavior or appearance may show a customer wearing a long coat on a hot day, a customer walking with two small children which may be the customer's children or grandchildren, a customer moving in a hurried or leisurely manner, or any other type of behavior or appearance attributes of a customer, the customer's companions, or the customer's vehicle.

Audio/video capture device 802 transmits audio data 804 and video data 806 to smart detection engine 808. Audio data 804 and video data 806 may be referred to as detection data. Smart detection engine 808 is software for analyzing audio data 804 and video data 806. In this example, smart detection engine 808 processes audio data 804 and video data 806 into data and metadata to form dynamic data 820. Dynamic data 820 includes, but is not limited to, external data 810, customer identification data 814, grouping data 816, customer event data 818, and current events data 822. Customer grouping data is data describing a customer's companions, such as children, parents, siblings, peers, friends, and/or pets.

Processing the audio data 804 and video data 806 may include filtering audio data 804 and video data 806 for relevant data elements, analyzing audio data 804 and video data 806 to form metadata describing or categorizing the contents of audio data 804 and video data 806, or combining audio data 804 and video data 806 with other audio data, video data, and data associated with a group of customers received from cameras.

Smart detection engine 808 uses computer vision and pattern recognition technologies to analyze audio data 804 and/or video data 806. Smart detection engine 808 includes license plate recognition technology which may be deployed in a parking lot or at the entrance to a retail facility where the license plate recognition technology catalogs a license plate of each of the arriving and departing vehicles in a parking lot associated with the retail facility.

Smart detection engine 808 includes behavior analysis technology to detect and track moving objects and classify the objects into a number of predefined categories. As used herein, an object may be a human customer, an item, a container, a shopping cart or shopping basket, or any other object inside or outside the retail facility. Behavior analysis technology could be deployed on various cameras overlooking a parking lot, a perimeter, or inside a facility.

Face detection/recognition technology may be deployed in parking lots, at entry ways, and/or throughout the retail facility to capture and recognize faces. Badge reader technology may be employed to read badges. Radar analytics technology may be employed to determine the presence of objects. Events from access control technologies can also be integrated into smart detection engine 808.

The events from all the above detection technologies are cross indexed into a single repository, such as multi-mode database. In such a repository, a simple time range query across the modalities will extract license plate information, vehicle appearance information, badge information, and face appearance information, thus permitting an analyst to easily correlate these attributes.

Smart detection system 800 may be implemented using any known or available software for performing voice analysis, facial recognition, license plate recognition, and sound analysis. In this example, smart detection system 800 is implemented as IBM® smart surveillance system (S3) software.

The data gathered from the behavior analysis technology, license plate recognition technology, face detection/recognition technology, badge reader technology, radar analytics technology, and any other video/audio data received from a camera or other video/audio capture device is received by smart detection engine 808 for processing into dynamic data 820.

Figure 9:
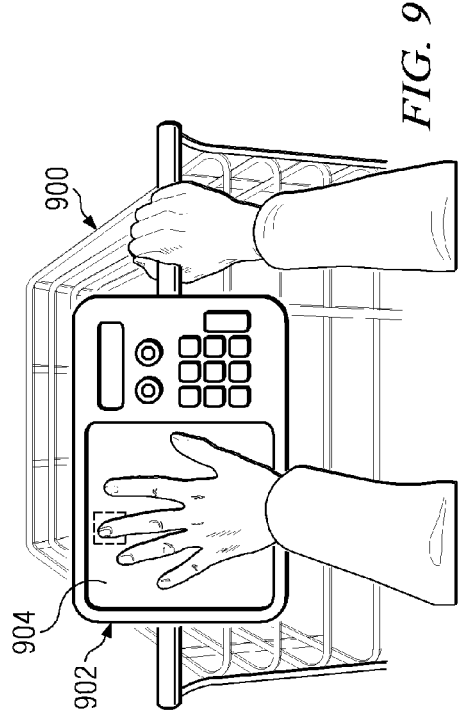
FIG. 9 is a block diagram of a shopping container in accordance with an illustrative embodiment.

FIG. 9 is a block diagram of a shopping container in accordance with an illustrative embodiment. Shopping container 900 is a container for carrying, moving, or holding items selected by a customer, such as container 220 in FIG. 2. In this example, container 900 is a shopping cart.

Display device 902 is a multimedia display device for presenting or displaying customized digital marketing messages to one or more customers, such as display devices 226 in FIG. 2 or display device 430 in FIG. 4. In this example, display device is coupled to shopping container 900. Display device 902 displays customized digital marketing messages received from a derived marketing messages device, such as derived marketing messages 626 in FIG. 6.

Biometric device 904 is any type of known or available device for measuring a physiological response or trait associated with a customer. Biometric device 904 is a biometric device, such as, without limitation, biometric device 222 in FIG. 2. Biometric device 904 may be a biometric device for measuring a customer's heart rate over a given period of time, a change in voice stress for the customer's voice, a change in blood pressure, and/or a change in pupil dilation that does not correlate or correspond to a change in an ambient lighting level.

In this example, biometric device 904 is coupled to shopping container 900. Biometric device 904 monitors biometric readings of a customer and detects changes in the biometric readings of the customer that exceeds a threshold change. In this example, biometric device 904 is a device for measuring a customer's heart rate over time. Biometric device 904 obtains the customer's pulse rate by measuring the customer's finger pulse.

In another embodiment, biometric device 904 may also identify a customer based on a fingerprint scan, voiceprint analysis, and/or retinal scan. For example, biometric device 904 may dynamically identify the customer by scanning the customer's fingerprint and/or analyzing fingerprint data associated with the customer to determine the customer's identity. In one example, biometric device 904 may, but is not required to, connected to a remote data storage device storing data to retrieve customer fingerprint data for use in identifying a given customer using the customer's fingerprint. Biometric device 904 may be connected to the remote data storage device via a wireless network connection, such as network 102 in FIG. 1.

In this example, biometric device 904 is coupled, attached, or imbedded in a handle of shopping container 900. However, biometric device 904 may be coupled, attached, or imbedded in or on any part or member of shopping container 900.

In another embodiment, biometric device 904 is coupled, attached, associated with, or imbedded within display device 902. In this example, display device 902 may use biometric device 904 to dynamically identifying the customer by scanning the customer's fingerprint and/or analyzing data associated with the customer's fingerprint to determine the customer's identity.

Figure 10:
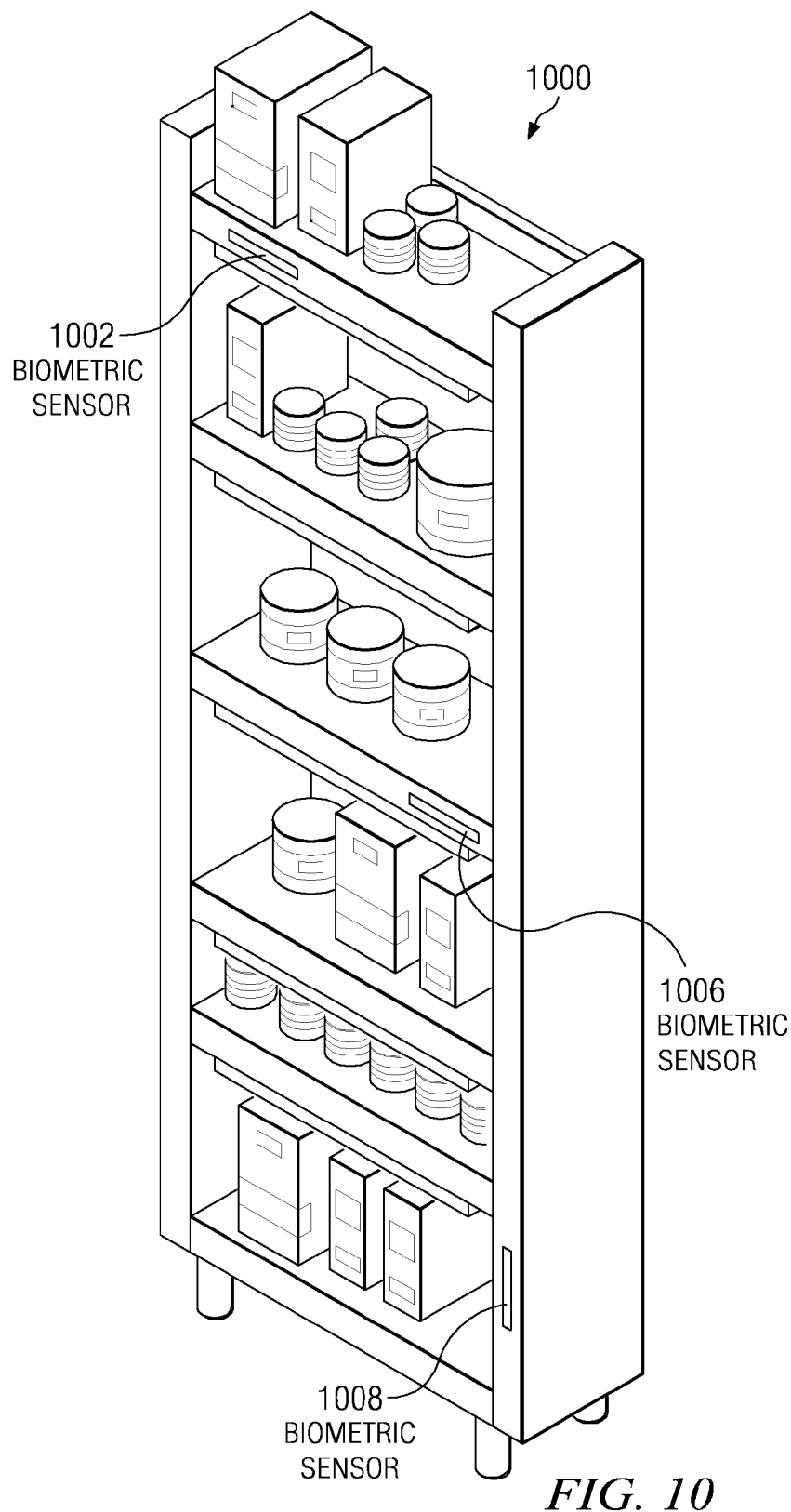
FIG. 10 is a block diagram of a shelf in a retail facility in accordance with an illustrative embodiment.

FIG. 10 is a block diagram of a shelf in a retail facility in accordance with an illustrative embodiment. Shelf 1000 is any type of device for showing, displaying, storing, or holding items. Shelf 1000 may be a shelf in a refrigerator or a freezer, as well as a shelf at room temperature. Shelf 1000 includes biometric sensors 1002-1008 for detecting biometric data associated with a customer. When a customer is standing in proximity to shelf 1000, such as when a customer is shopping, browsing, and/or selecting one or more items for purchase, biometric sensors 1002-1008 monitor biometric readings associated with the customer, such as, without limitation, the customer's heart rate, respiration rate, body temperature, pupil dilation, fingerprint, thumbprint, and/or any other biometric data. The customer's positive and negative reactions to customized marketing messages and/or items offered for sale are determined by analyzing the biometric data gathered by biometric sensors 1002-1008.

FIG. 11 is a block diagram illustrating a set of risk assessment factors used to generate a risk assessment score for a customer in accordance with an illustrative embodiment. Risk assessment factors are factors that are used to generate total risk assessment score 1124 for a customer. The risk assessment factors are used to determine the potential risk a customer poses to the retail facility. Risk assessment factors includes factors such as, but not limited to, a customer's credit score 1102, amount of revenue per transaction 1104 generated by the customer, coupons/discounts/price matching 1106 and other indicators that a customer is cost-conscious, sale items purchased per transaction/price sensitivity 1108 of the customer, name brands versus generic brands 1110 purchased by the customer, shoplifting/criminal history 1112, customer history/customer loyalty to the retail facility 1114, customer income 1116, frequency of transactions/regularity of patronage 1118, product returns 1120, and/or customer complaints 1122 made by the customer. Risk assessment factors could include all these risk factors or only some of these risk factors.

Risk assessment factors could also include additional factors not shown in FIG. 11, such as number of items returned, number of service calls made, number of items exchanged, number of children brought into the retail facility during shopping trips, number of civil lawsuits filed against retail facilities, history of frivolous lawsuits filed against businesses, liens against the customer's property, a history of lawsuits against the retail facility that were settled out of court, and any other factors that could indicate whether a customer is a desirable customer or a customer that poses a potential risk or threat to the store.

FIG. 12 is a block diagram illustrating a risk assessment engine for generating a risk assessment score for a customer in accordance with an illustrative embodiment. Risk assessment engine 1200 is a risk assessment engine for identifying risk assessment factors and generating risk assessment scores for customers, such as risk assessment engine 422 in FIG. 4.

Risk assessment engine 1200 generates risk assessment factors 1202 based on a customer profile, such as profile data 406 in FIG. 4, credit history and credit rating, bankruptcy filings, civil and criminal lawsuits, data regarding the customer's past purchases, exchanges, and returns, criminal records, court records, and other publicly available information regarding the customer.

Risk assessment engine 1200 processes risk assessment factors 1202 in derived model 1204 to generate weighted risk assessment factors 1206. Derived model 1204 processes risk assessment factors 1202 using at least one of a statistical method, a data mining method, and/or pre-generated manual input from users to generate weighted risk assessment factors 1206. Weighted risk assessment factors 1206 take into account the fact that some risk factors are more important than others. For example, if a customer has a history of shoplifting, this factor is of more importance than a risk factor that indicates the customer makes frequent customer complaints.

Weighted risk assessment factors 1206 are processed with cohort data 1208 to generate weighted risk assessment score 1210. Cohort data 1208 is data describing the customer, such as the customer's appearance and behavior. The cohort data may describe the customer as wearing a trench coat in warm weather or wearing sunglasses indoors. Cohort data 1208 may also include data describing behavior of the customer, such as, without limitation, walking fast, walking slowly, carrying a large bag, loitering, pacing, or any other behaviors and/or behavior patterns of the customer. Cohort data 1208 may also include profile data for the customer, such as, profile data 406 in FIG. 4.

Figure 13:
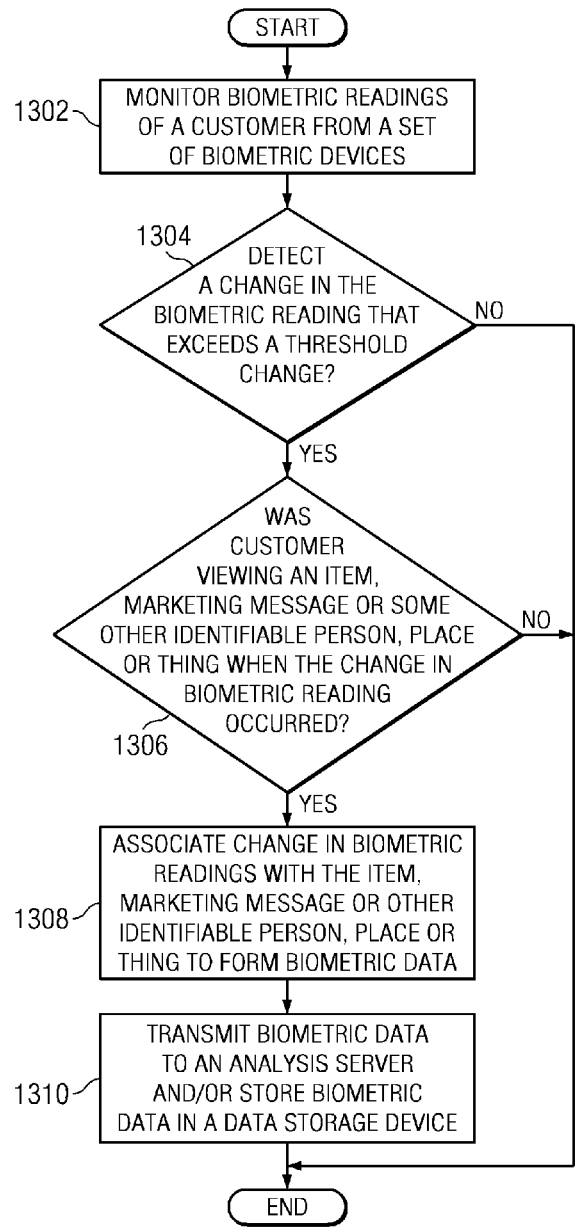
FIG. 13 is a flowchart illustrating a process for monitoring for a change in biometric readings associated with a customer in accordance with an illustrative embodiment.

Turning now to FIG. 13, a flowchart illustrating a process for monitoring for a change in biometric readings associated with a customer is depicted in accordance with an illustrative embodiment. The process may be implemented by a device for measuring physiological responses and/or traits of a customer, such as biometric devices 218 in FIG. 2 and/or biometric device 904 in FIG. 9.

The process begins by monitoring biometric readings of a customer obtained from a set of one or more biometric devices (step 1302). The process makes a determination as to whether a change in the biometric readings that exceeds a threshold change has been detected (step 1304). If a change exceeding the threshold is not detected, the process terminates thereafter.

Returning to step 1304, if a change exceeding the threshold is detected, the process makes a determination as to whether the customer was viewing an item, a marketing message, or some other identifiable person, place, or thing when the change in biometric readings occurred (step 1306). If the customer was not viewing an item, a marketing message, or some other identifiable person, place, or thing, the process terminates thereafter.

Returning to step 1306, if the customer was viewing an item, marketing message, or something else identifiable, the process associates the change in biometric reading with the item, the marketing message, or the identifiable person, place, or thing to form the biometric data (step 1308). The process transmits the biometric data to an analysis server and/or stores the biometric data in a data storage device for later use in generating customized marketing messages in the future (step 1310) with the process terminating thereafter.

Figure 14:
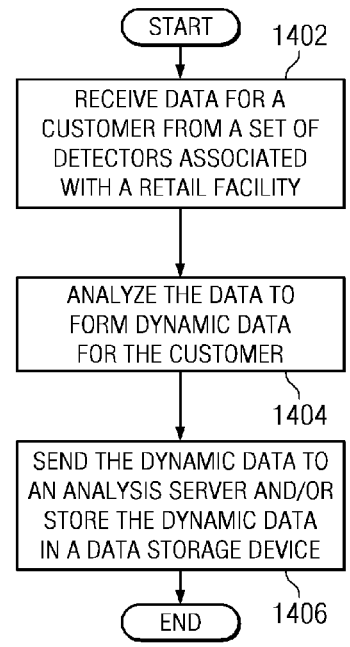
FIG. 14 is a flowchart illustrating a process for generating dynamic data for a customer in accordance with an illustrative embodiment.

FIG. 14 is a flowchart illustrating a process for generating dynamic data for a customer in accordance with an illustrative embodiment. The process is implemented by smart detection system 1000 in FIG. 10. The process begins by receiving data for a customer from a set of detectors associated with the retail facility (step 1402). The data may be, without limitation, audio and/or video data from a camera located either inside or outside the retail facility. The process analyzes the data to form dynamic data for the customer (step 1404). The analysis involves using behavior analysis, license plate recognition, facial recognition, badge reader, radar analytics, and other analysis on the data. The process sends the dynamic data to an analysis server and/or stores the dynamic data in a data storage device (step 1406) with the process terminating thereafter.

FIG. 15 is a flowchart illustrating a process for identifying an undesirable customer in accordance with an illustrative embodiment. The process is implemented by risk assessment engine 422 in FIG. 4. The process begins by identifying a customer associated with a retail facility (step 1502). The customer may be outside the retail facility, such as, without limitation, in a parking lot, or inside the retail facility. The process retrieves dynamic data for the customer (step 1506). The process retrieves any biometric data for the customer (step 1510). The process performs a risk assessment analysis using the available dynamic data and/or biometric data (step 1512). The process also uses static customer data elements from a customer profile. The risk assessment analysis identifies risk assessment factors using the dynamic data, biometric data, and/or static customer data elements.

The process generates a risk assessment score for the customer based on the results of the risk assessment analysis (step 1514). The process makes a determination as to whether the risk assessment score indicates the customer is a desirable customer (step 1516). If the customer is a desirable customer, the process generates marketing incentives targeted to the customer (step 1518) with the process terminating thereafter. If the customer is not a desirable customer, the process generates marketing disincentives (step 1520) with the process terminating thereafter.

FIG. 16 is a flowchart illustrating a process for generating a risk assessment score in accordance with an illustrative embodiment. The process is implemented by risk assessment engine 422 in FIG. 4. The process begins by identifying risk assessment factors (step 1602) for the customer. The process analyzes the risk assessment factors using data mining, statistical methods, predefined weighting guidelines, and/or pre-generated manual input from users (step 1604). The process generates the weighted risk factors (step 1606) and analyzes the weighted risk factors with cohort data for the customer (step 1608). The process then generates a weighted risk assessment score for the customer using the weighted risk assessment factors and the cohort data (step 1610) with the process terminating thereafter.

Figure 17:
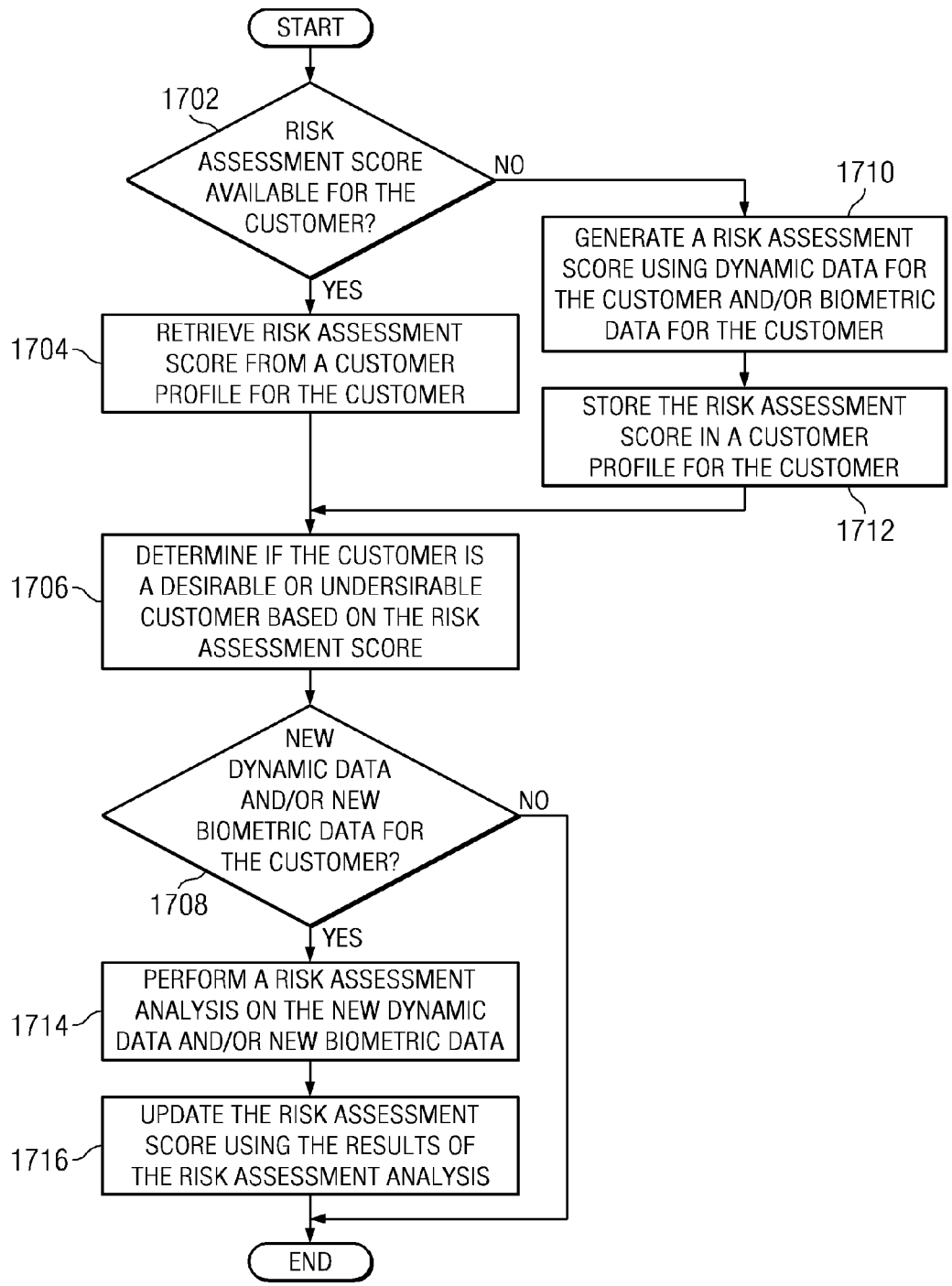
FIG. 17 is a flowchart illustrating a process for updating a risk assessment score in accordance with an illustrative embodiment.

FIG. 17 is a flowchart illustrating a process for updating a risk assessment score in accordance with an illustrative embodiment. The process is implemented by risk assessment engine 422 in FIG. 4. The process begins by making a determination as to whether a risk assessment score is available for the customer (step 1702). If a risk assessment score is available, the process retrieves the risk assessment score from a customer profile (step 1704). The process determines if the customer is a desirable customer or an undesirable customer based on the risk assessment score (step 1706).

If the score is not available at step 1702, the process generates a risk assessment score using dynamic data for the customer and/or biometric data (step 1710). The process stores the risk assessment score in a customer profile for the customer (step 1712).

The process makes a determination as to whether new dynamic data and/or new biometric data for the customer is available (step 1708). If new dynamic data and/or biometric data is not available, the process terminates thereafter. If new data is available, the process performs a risk assessment analysis on the new dynamic data and/or biometric data (step 1714). The process updates the risk assessment score using the results of the risk assessment analysis (step 1716) with the process terminating thereafter.

Figure 18:
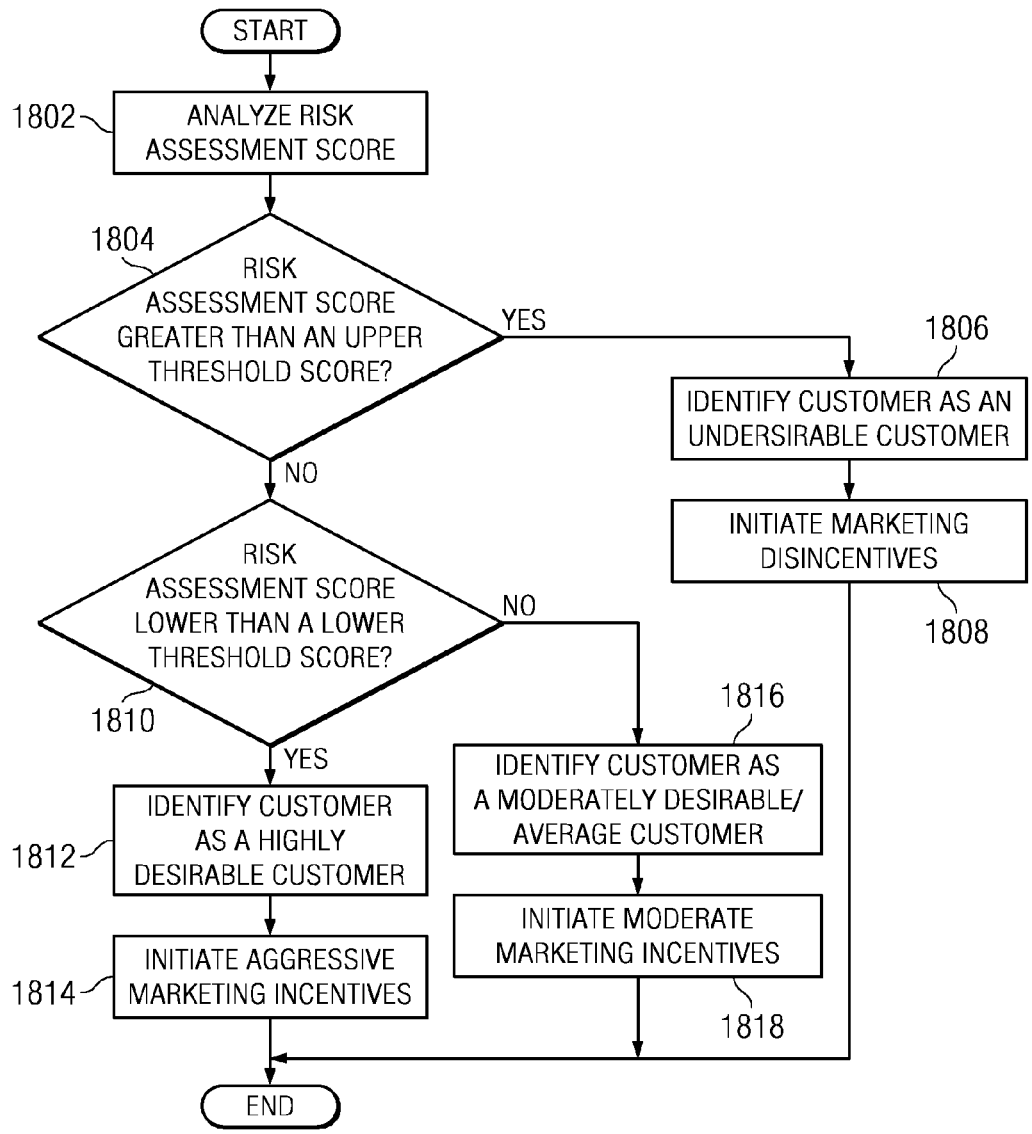
FIG. 18 is a flowchart illustrating a process for preferred customer marketing in accordance with an illustrative embodiment.

FIG. 18 is a flowchart illustrating a process for preferred customer marketing in accordance with an illustrative embodiment. The process is implemented by risk assessment engine 422 in FIG. 4. The process begins by analyzing a risk assessment score (step 1802) for a customer. The process makes a determination as to whether the risk assessment score is greater than an upper threshold score (step 1804). If the score is greater than the upper threshold, the process identifies the customer as an undesirable customer (step 1806) and initiates marketing disincentives (step 1808) directed towards the customer with the process terminating thereafter.

Returning to step 1804, if the score is not greater than the upper threshold, the process makes a determination as to whether the risk assessment score is lower than a lower threshold score (step 1810). If the score is lower than the lower threshold, the process identifies the customer as a highly desirable customer (step 1812) and initiates aggressive marketing incentives targeted to the customer (step 1814) with the process terminating thereafter.

Returning to step 1810, if the risk assessment score is lower than the upper threshold and higher than the lower threshold, the process identifies the customer as a moderately desirable/average customer (step 1816). The process initiates moderate marketing incentives targeted to the customer (step 1818) with the process terminating thereafter.

In another embodiment, a customer is identified as an undesirable customer is the risk assessment score is lower than a lower threshold. In this case, a customer is identified as a desirable customer if the risk assessment score is greater than an upper threshold. In other words, any type of scoring method and threshold may be used to identify customers that are more likely to cause a risk of financial losses and/or legal problems for the retail facility than other customers.

Figure 19:
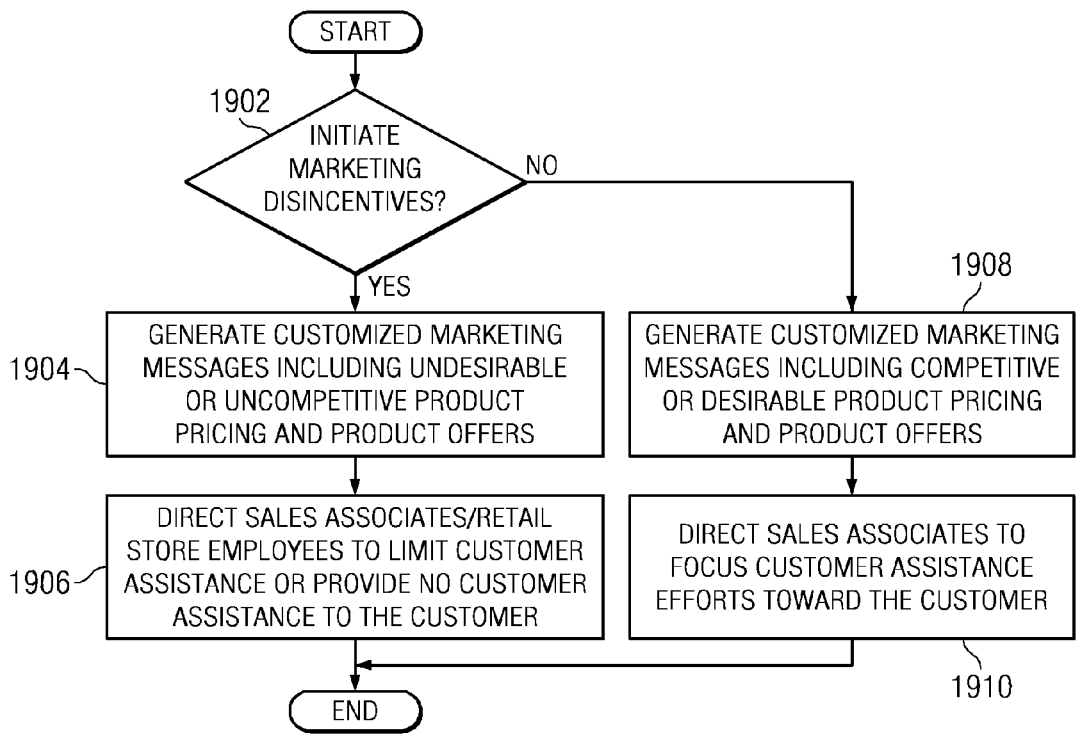
FIG. 19 is a flowchart illustrating a process for marketing disincentives in accordance with an illustrative embodiment.

FIG. 19 is a flowchart illustrating a process for marketing disincentives in accordance with an illustrative embodiment. The process is implemented by risk assessment engine 422 in FIG. 4. The process begins by making a determination as to whether to initiate marketing disincentives targeted to the customer (step 1902). If marketing disincentives are initiated, the process generates customized marketing messages for the customer that includes undesirable or uncompetitive product pricing and product offers (step 1904) and directs sales associates/retail store employees to limit customer assistance or provide no customer assistance to the customer (step 1906) with the process terminating thereafter.

If marketing disincentives are not initiated, the process generates customized marketing messages including competitive or desirable product pricing and product offers (step 1908) and directs sales associates to focus customer assistance efforts towards the customer (step 1910) with the process terminating thereafter.

Figure 20:
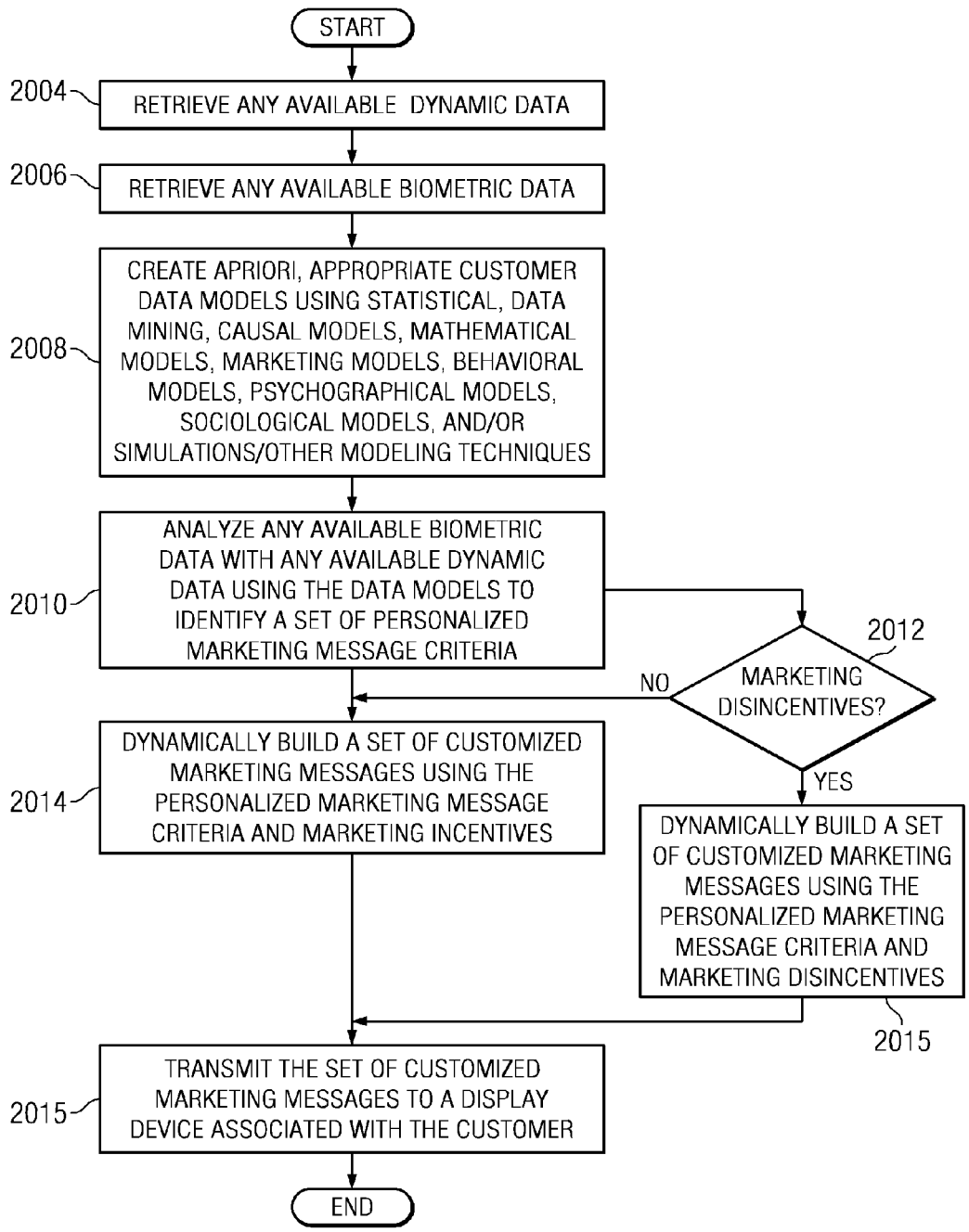
FIG. 20 is a flowchart illustrating a process for generating a customized marketing message using dynamic data in accordance with an illustrative embodiment.

FIG. 20 is a flowchart illustrating a process for generating a customized marketing message using dynamic data in accordance with an illustrative embodiment. The process in FIG. 20 is implemented by a server, such as analysis server 402 in FIG. 4.

The process begins by retrieving any available dynamic data for a customer (step 2004). The dynamic data includes, without limitation, grouping data, external data, customer identification data, vehicle identification data, customer behavior data, and/or any other dynamic customer data elements. The process retrieves any available biometric data (step 2006) for the customer.

The process pre-generates or creates in advance, appropriate data models using at least one of a statistical method, data mining method, causal model, mathematical model, marketing model, behavioral model, psychographical model, sociological model, simulations/modeling techniques, and/or any combination of models, data mining, statistical methods, simulations and/or modeling techniques (step 2008). The process analyzes dynamic data using one or more of the appropriate data models to identify a set of personalized marketing message criteria (step 2010). The set of personalized marketing message criteria may include one or more criterion for generating a personalized marketing message.

The process makes a determination as to whether to initiate marketing disincentives directed towards the customer (step 2012). If marketing disincentives are not initiated, the process dynamically builds a set of one or more customized marketing messages using the personalized marketing message criteria and marketing incentives (step 2014). If marketing disincentives are initiated, the process dynamically builds a set of one or more customized marketing messages using the personalized marketing message criteria and marketing disincentives (step 2015). The process then transmits the set of customized marketing messages to a display device associated with the customer (step 2016) for presentation of the marketing message to the customer, with the process terminating thereafter.

Thus, the illustrative embodiments provide a computer implemented method, apparatus, and computer program product for managing a level of marketing disincentives directed towards a customer using a risk assessment score. In one embodiment, a risk assessment score for a customer associated with a retail facility is retrieved. The risk assessment score is analyzed to determine whether the customer is a desirable customer or an undesirable customer. In response to the risk assessment score indicating that the customer is an undesirable customer, aggressive marketing disincentives targeted to the undesirable customer are generated. If the risk assessment score indicates the customer is a desirable customer, marketing incentives targeted to the desirable customer are generated.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing a level of marketing directed towards a customer using a risk assessment score, the computer implemented method comprising:
    retrieving a risk assessment score for a customer associated with a retail facility, wherein the risk assessment score is at least based upon appearance and behavior of the customer inside the retail facility;
    comparing, by a processor, the risk assessment score to a threshold score to determine whether the customer is an undesirable customer; and
    responsive to the risk assessment score indicating that the customer is the undesirable customer, initiating aggressive marketing disincentives targeted to the undesirable customer, wherein the aggressive marketing disincentives comprise providing information to a set of employees associated with the retail facility that the customer is the undesirable customer and directing the set of employees to avoid offering assistance unless assistance is requested by the customer.

2. The computer implemented method of claim 1 further comprising:
    responsive to a determination that the risk assessment score is greater than an upper threshold score, identifying the customer as the undesirable customer and initiating the aggressive marketing disincentives, wherein the aggressive marketing disincentives are marketing initiatives intended to decrease an amount of time the customer spends shopping in the retail facility.

3. The computer implemented method of claim 1 further comprising:
    responsive to a determination that the risk assessment score is less than an lower threshold score, identifying the customer as a highly desirable customer; and
    initiating aggressive marketing incentives targeted to the customer.

4. The computer implemented method of claim 3 wherein initiating the aggressive marketing incentives further comprises:
    notifying an employee associated with the retail facility to assist the customer.

5. The computer implemented method of claim 3 wherein initiating the aggressive marketing incentives further comprises:
    providing the customer with a display device, wherein customized marketing messages are presented to the customer on the display device, wherein the customized marketing messages present competitive product pricing and preferred product offers, and wherein the display device provides the customer with a map and locations of items in the retail facility to improve a shopping experience of the customer.

6. The computer implemented method of claim 1 further comprising:
    responsive to a determination that the risk assessment score is less than an upper threshold score and greater than a lower threshold score, identifying the customer as a moderately desirable customer; and
    initiating moderate marketing incentives targeted to the customer, wherein moderate marketing incentives comprises marketing incentives that are cheaper to generate and present to the customer than aggressive marketing incentives.

7. The computer implemented method of claim 1 wherein the aggressive marketing disincentives targeted to the undesirable customer further comprises:
    displaying disincentive marketing messages to the customer, wherein a disincentive marketing message comprises uncompetitive product pricing and undesirable product offers.

8. The computer implemented method of claim 1 wherein the aggressive marketing disincentives targeted to the undesirable customer further comprises:
    creating a negative ambiance in an area of the retail facility associated with the customer.

9. The computer implemented method of claim 8 wherein creating the negative ambiance further comprises shining lights in an area of the retail facility occupied by the customer.

10. The computer implemented method of claim 8 wherein creating the negative ambiance further comprises playing subliminal messages over a sound system, wherein the subliminal messages encourage the customer to leave the retail facility.

11. The computer implemented method of claim 2 wherein creating the negative ambiance further comprises playing music over a sound system, wherein the music is designed to encourage the customer to feel uncomfortable.

12. The computer implemented method of claim 8 wherein creating the negative ambiance further comprises adjusting a temperature in an area of the retail facility to an uncomfortable temperature, wherein the uncomfortable temperature is at least one of a temperature that is colder than a predetermined temperature, higher than a predetermined comfortable temperature, and a humidity that is higher than a predetermined comfortable humidity level.

13. A computer program product comprising:
a computer usable storage medium having computer usable program code embodied therewith, the computer usable program code comprising:
computer usable program code for managing a level of marketing directed towards a customer using a risk assessment score, the computer program product comprising:
computer usable program code for retrieving a risk assessment score for a customer associated with a retail facility, wherein the risk assessment score is at least based upon appearance and behavior of the customer inside the retail facility;
computer usable program code for comparing the risk assessment score to a threshold score to determine whether the customer is an undesirable customer; and
computer usable program code for generating aggressive marketing disincentives targeted to the undesirable customer in response to the risk assessment score indicating that the customer is the undesirable customer, wherein the aggressive marketing disincentives comprise providing information to a set of employees associated with the retail facility that the customer is the undesirable customer and directing the set of employees to avoid offering assistance unless assistance is requested by the customer.

14. The computer program product of claim 13 further comprising:
computer usable program code for identifying the customer as the undesirable customer and initiating the aggressive marketing disincentives in response to a determination that the risk assessment score is greater than an upper threshold score, wherein the aggressive marketing disincentives are intended to decrease an amount of time the customer spends shopping in the retail facility.

15. The computer program product of claim 13 further comprising:
computer usable program code for identifying the customer as a highly desirable customer in response to a determination that the risk assessment score is less than an lower threshold score; and
computer usable program code for initiating aggressive marketing incentives targeted to the customer.

16. The computer program product of claim 13 further comprising:
computer usable program code for identifying the customer as a moderately desirable customer in response to a determination that the risk assessment score is less than an upper threshold score and greater than a lower threshold score; and
computer usable program code for initiating moderate marketing incentives targeted to the customer, wherein moderate marketing incentives comprises marketing incentives that are cheaper to generate and present to the customer than aggressive marketing incentives.

17. The computer program product of claim 13 further comprising:
computer usable program code for displaying disincentive marketing messages to the undesirable customer, wherein a disincentive marketing message comprises uncompetitive product pricing and undesirable product offers.

18. The computer program product of claim 13 wherein the computer usable code for initiating the aggressive marketing disincentives targeted to the undesirable customer further comprises:
computer usable program code for creating a negative ambiance in an area of the retail facility associated with the customer, wherein creating the negative ambiance is accomplished by performing at least one of shining lights in an area of the retail facility occupied by the customer, playing subliminal messages over a sound system, wherein the subliminal messages encourage the customer to leave the retail facility, playing music over the sound system, wherein the music is designed to encourage the customer to leave, and adjusting a temperature in an area of the retail facility to an uncomfortable temperature, wherein the uncomfortable temperature is at least one of a temperature that is colder than a predetermined temperature, higher than a predetermined comfortable temperature, and a humidity that is higher than a predetermined comfortable humidity level.

19. A data processing system for managing a level of marketing directed towards a customer using a risk assessment score, the data processing system comprising:
a bus system;
a communications system connected to the bus system;
a memory connected to the bus system, wherein the memory includes computer usable program code; and
a processing unit connected to the bus system, wherein the processing unit executes the computer usable program code to retrieve a risk assessment score for a customer associated with a retail facility, wherein the risk assessment score is at least based upon appearance and behavior of the customer inside the retail facility; compare the risk assessment score to a threshold score to determine whether the customer is an undesirable customer; identify the customer as the undesirable customer in response to a determination that the risk assessment score is greater than an upper threshold score, and generate aggressive marketing disincentives targeted to the undesirable customer, wherein the aggressive marketing disincentives comprise providing information to a set of employees associated with the retail facility that the customer is the undesirable customer and directing the set of employees to avoid offering assistance unless assistance is requested by the customer.

20. The data processing system of claim 19 wherein the processing unit further executes the computer usable program code to identify the customer as the undesirable customer and initiating the aggressive marketing disincentives in response to a determination that the risk assessment score is greater than the upper threshold score, wherein the aggressive marketing disincentives are intended to decrease an amount of time the customer spends shopping in the retail facility.

21. The data processing system of claim 19 wherein the processing unit further executes the computer usable program code to identify the customer as a moderately desirable customer in response to a determination that the risk assessment score is less than the upper threshold score and greater than a lower threshold score and initiate moderate marketing incentives targeted to the customer, wherein moderate marketing incentives comprises marketing incentives that are cheaper to generate and present to the customer than aggressive marketing incentives.

22. The data processing system of claim 19 wherein the processing unit further executes the computer usable program code to create a negative ambiance in an area of the retail facility associated with the customer, wherein creating the negative ambiance is accomplished by performing at least one of shining lights in an area of the retail facility occupied by the undesirable customer, playing subliminal messages over a sound system, wherein the subliminal messages encourage the undesirable customer to leave the retail facility, playing music over the sound system, wherein the music is designed to encourage the undesirable customer to leave, and adjusting a temperature in an area of the retail facility to an uncomfortable temperature, wherein the uncomfortable temperature is at least one of a temperature that is colder than a predetermined temperature, higher than a predetermined comfortable temperature, and a humidity that is higher than a predetermined comfortable humidity level.

23. A system for managing a level of marketing directed towards a customer using a risk assessment score, the system comprising:

a risk assessment engine, wherein the risk assessment engine retrieves a risk assessment score for a customer associated with a retail facility and compares the risk assessment score to a threshold score to determine whether the customer is an undesirable customer, wherein the risk assessment score is at least based upon appearance and behavior of the customer inside the retail facility; and a disincentives generating engine, wherein the disincentives generating engine generates aggressive marketing disincentives targeted to the undesirable customer in response to the risk assessment score indicating that the customer is the undesirable customer, wherein the aggressive marketing disincentives comprise providing information to a set of employees associated with the retail facility that the customer is the undesirable customer and directing the set of employees to avoid offering assistance unless assistance is requested by the customer.

* * * * *